United States Patent
Jammikunta et al.

(10) Patent No.: US 9,984,366 B1
(45) Date of Patent: May 29, 2018

(54) SECURE PAPER-FREE BILLS IN WORKFLOW APPLICATIONS

(71) Applicant: Hand Held Products, Inc., Fort Mill, SC (US)

(72) Inventors: Ravi Kumar Jammikunta, Hyderabad (IN); Balaji Polisetty, Hyderabad (IN); Nishant Sharma, Hyderabad (IN); Akhil Dabral, Dehradun (IN)

(73) Assignee: Hand Held Products, Inc., Fort Mill, SC (US)

(*) Notice: Subject to any disclaimer, the term of this patent is extended or adjusted under 35 U.S.C. 154(b) by 0 days. days.

(21) Appl. No.: 15/688,133

(22) Filed: Aug. 28, 2017

(30) Foreign Application Priority Data

Jun. 9, 2017 (IN) .............................. 201711020273

(51) Int. Cl.
*G06Q 20/00* (2012.01)
*G06Q 20/32* (2012.01)
(Continued)

(52) U.S. Cl.
CPC ..... *G06Q 20/3274* (2013.01); *G06Q 20/0453* (2013.01); *G06Q 20/0457* (2013.01);
(Continued)

(58) Field of Classification Search
CPC ........... G06Q 20/3226; G06Q 20/3227; G06Q 20/0453; G06Q 20/0457; G06Q 20/3274
(Continued)

(56) References Cited

U.S. PATENT DOCUMENTS 6,832,725 B2 12/2004 Gardiner et al.
7,128,266 B2 10/2006 Zhu et al.
(Continued)

FOREIGN PATENT DOCUMENTS

WO 2013163789 A1 11/2013

OTHER PUBLICATIONS

Harish et al., "Secured QR-Code Based COD Payment Though Mobile Bill Presentment System Replacing the POS Machine With an Electronic Device", International Journal of Advance Research in Science and Engineering, vol. No. 5, Issue No. 02, Feb. 2016, www.ijarse.com.

*Primary Examiner* — Daniel Hess
(74) *Attorney, Agent, or Firm* — Additon, Higgins & Pendleton, P.A.

(57) ABSTRACT

A system and method allows for paperless billing transaction document exchanges between two parties to a sales transaction, with inherent document verification. In an embodiment, the system and method first encrypts the transaction document data according to a password which itself depends on unique transaction data in a particular sales document. The system and method then employs the unique data values to create a first 2-D barcode which directly represents the document data; and to create a second 2-D barcode which represents the encrypted document data. The two matrix codes are overlapped on a cell-by-cell basis into a single visual representation, employing multiple colors for different combinations of overlapped cells. At a receiving end, the two original matrix codes can be separated by extracting the two black and white 2-D barcodes from the combined color code. The data integrity of the received data is confirmed by checking that the encrypted 2-D barcode is consistent with the plaintext 2-D barcode. Additional methods are employed to attach secure, merged biometric image signatures, such as merged fingerprint images, to the merged 2-D barcode form of the transaction document.

20 Claims, 12 Drawing Sheets

(51) Int. Cl.
*G06Q 20/40* (2012.01)
*G06Q 20/04* (2012.01)

(52) U.S. Cl.
CPC ..... *G06Q 20/3226* (2013.01); *G06Q 20/3227* (2013.01); *G06Q 20/40145* (2013.01)

(58) Field of Classification Search
USPC ........................................................ 235/494
See application file for complete search history.

(56) References Cited

U.S. PATENT DOCUMENTS

| | | |
|---|---|---|
| 7,159,783 B2 | 1/2007 | Walczyk et al. |
| 7,413,127 B2 | 8/2008 | Ehrhart et al. |
| 7,726,575 B2 | 6/2010 | Wang et al. |
| 7,783,893 B2 | 8/2010 | Gorelik et al. |
| 8,294,969 B2 | 10/2012 | Plesko |
| 8,317,105 B2 | 11/2012 | Kotlarsky et al. |
| 8,322,622 B2 | 12/2012 | Liu |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Caballero |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |

(56) References Cited

U.S. PATENT DOCUMENTS

| | | |
|---|---|---|
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,235,553 B2 | 1/2016 | Fitch et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey et al. |
| 9,360,304 B2 | 6/2016 | Xue et al. |
| 9,361,882 B2 | 6/2016 | Ressler et al. |
| 9,365,381 B2 | 6/2016 | Colonel et al. |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,383,848 B2 | 7/2016 | Daghigh |
| 9,384,374 B2 | 7/2016 | Bianconi |
| 9,390,596 B2 | 7/2016 | Todeschini |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| D766,244 S | 9/2016 | Zhou et al. |

(56) References Cited

U.S. PATENT DOCUMENTS

| | | |
|---|---|---|
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 2007/0063048 A1 | 3/2007 | Havens et al. |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0332524 A1 | 12/2013 | Fiala et al. |
| 2014/0001267 A1 | 1/2014 | Giordano et al. |
| 2014/0002828 A1 | 1/2014 | Laffargue et al. |
| 2014/0025584 A1 | 1/2014 | Liu et al. |
| 2014/0100813 A1 | 1/2014 | Showering |
| 2014/0034734 A1 | 2/2014 | Sauerwein |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0152882 A1 | 6/2014 | Samek et al. |
| 2014/0158770 A1 | 6/2014 | Sevier et al. |
| 2014/0159869 A1 | 6/2014 | Lumsteg et al. |
| 2014/0166755 A1 | 6/2014 | Liu et al. |
| 2014/0166757 A1 | 6/2014 | Smith |
| 2014/0168787 A1 | 6/2014 | Wang et al. |
| 2014/0175165 A1 | 6/2014 | Havens et al. |
| 2014/0191913 A1 | 7/2014 | Ge et al. |
| 2014/0197239 A1 | 7/2014 | Havens et al. |
| 2014/0197304 A1 | 7/2014 | Feng et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0009338 A1 | 1/2015 | Laffargue et al. |
| 2015/0014416 A1 | 1/2015 | Kotlarsky et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0088522 A1 | 3/2015 | Hendrickson et al. |
| 2015/0096872 A1 | 4/2015 | Woodburn |
| 2015/0100196 A1 | 4/2015 | Hollifield |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0133047 A1 | 5/2015 | Smith et al. |

(56) References Cited

U.S. PATENT DOCUMENTS

| | | |
|---|---|---|
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0186703 A1 | 7/2015 | Chen et al. |
| 2015/0199957 A1 | 7/2015 | Funyak et al. |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0310243 A1 | 10/2015 | Ackley et al. |
| 2015/0310389 A1 | 10/2015 | Crimm et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0055552 A1 | 2/2016 | Chai et al. |
| 2016/0057230 A1 | 2/2016 | Todeschini et al. |
| 2016/0062473 A1 | 3/2016 | Bouchat et al. |
| 2016/0092805 A1 | 3/2016 | Geisler et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0192051 A1 | 6/2016 | DiPiazza et al. |
| 2016/0125873 A1 | 7/2016 | Braho et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0316190 A1 | 7/2016 | McCloskey et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |
| 2016/0327930 A1 | 11/2016 | Charpentier et al. |
| 2016/0328762 A1 | 11/2016 | Pape |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Germaine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0108838 A1 | 4/2017 | Todeschini et al. |
| 2017/0108895 A1 | 4/2017 | Chamberlin et al. |
| 2017/0118355 A1 | 4/2017 | Wong et al. |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0139012 A1 | 5/2017 | Smith |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0150124 A1 | 5/2017 | Thuries |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |

(56) References Cited

U.S. PATENT DOCUMENTS

| | | |
|---|---|---|
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |

FIG. 1    Portable Tablet Computing Device
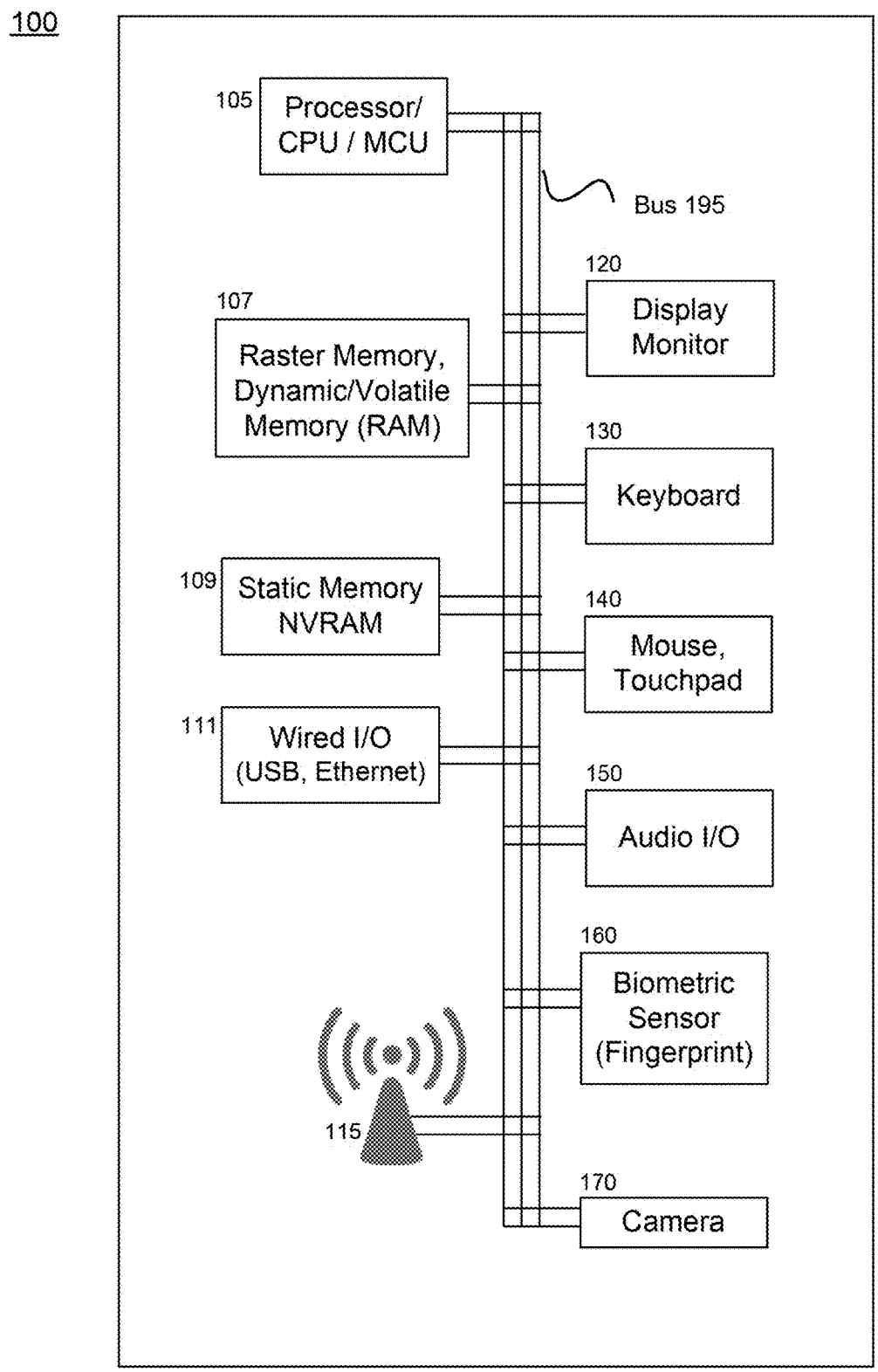

FIG. 2            Transaction Invoice

200

Sender (240.5)

Date/Time (240.1)

SALES INVOICE

[Forever Audio]
[*Unforgettable Sound*]

[1234 Main Street]
[Germantown, MD 20853]
Phone: [301-555-9878]
Fax: [XXX-XXX-XXXX]

Invoice Number (240.2)

Sender ID (240.4)

DATE: [11/22/2016]
INVOICE #: [331277]
Sender ID: [99-102]

BILL TO:
[Linda James]
[Liberty Dance Studios]
[2020 Central Road]
[Philadelphia PA 19101]
Phone: [XXX-XXX-XXXX]

— Name of Receiver (240.6)
— Company Name (240.7)
— Company Phone or E-mail (240.8)

| Items Subject to Sales Tax | | | |
|---|---|---|---|
| [Speaker Installation] | 4 | $20 | $80 |

| Items Subject to Sales Tax | Qty | $/Unit | |
|---|---|---|---|
| [Deluxe Boom Speakers (Model 17)] | 4 | $75 | $300 |

COMMENTS
1. Payment due in [15] business days
2. Include invoice number on check or e-transfer
3. Payments or e-payments to [Forever Audio]

Tax: [$12.85]
Other:
TOTAL: $392.85

We appreciate your business!

Total Amount Due (240.3)

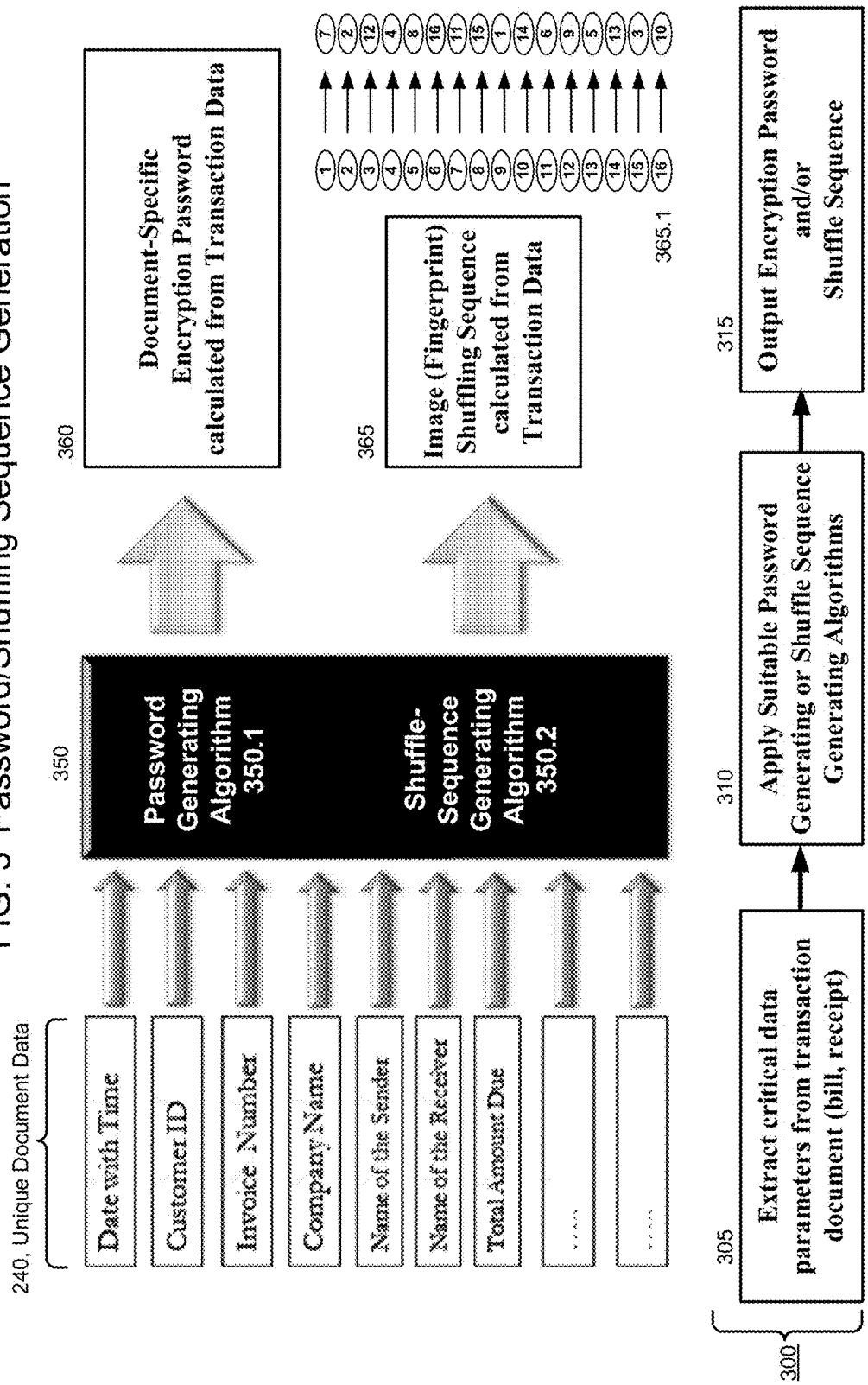
FIG. 3 Password/Shuffling Sequence Generation

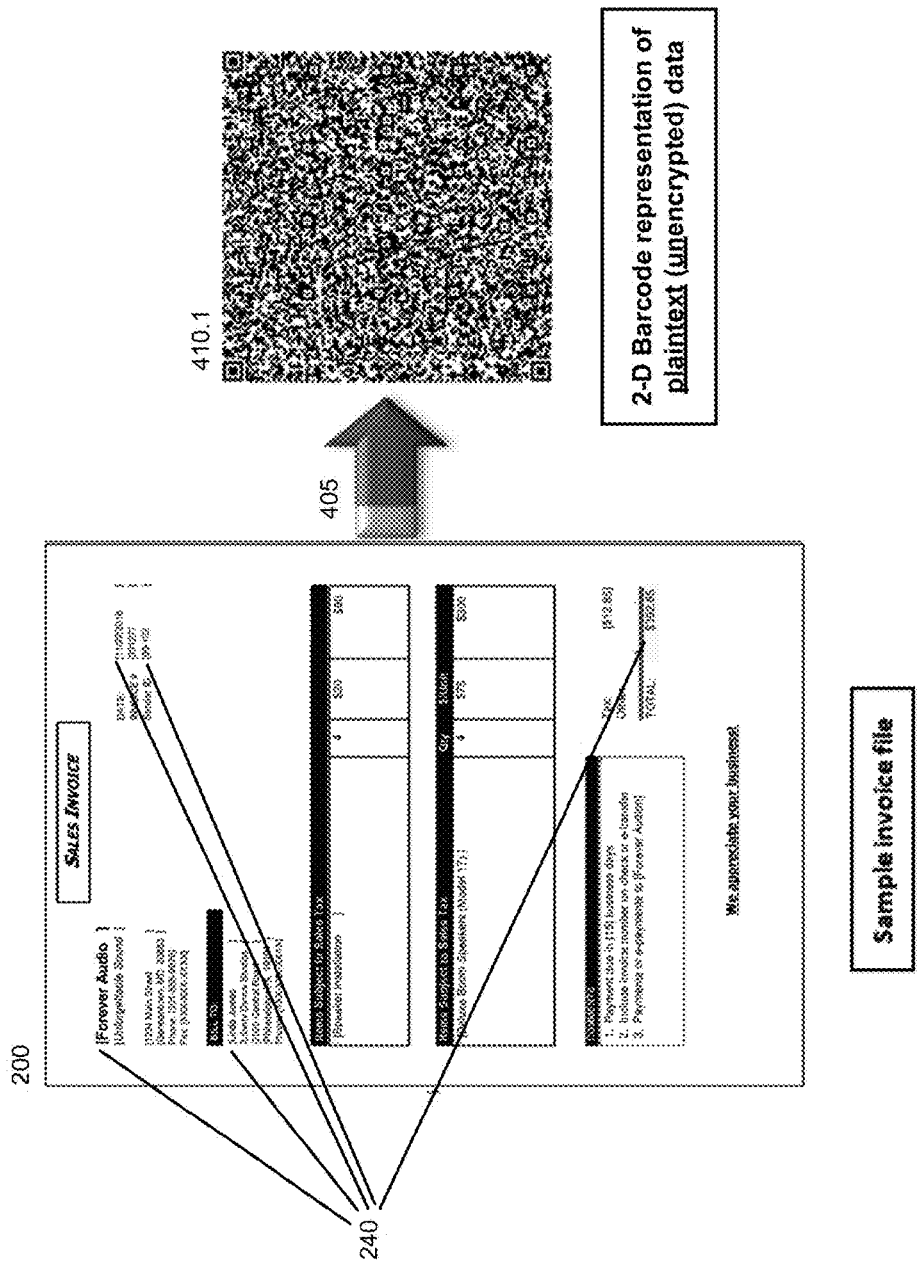
FIG. 4A   Generation of 2-D Barcode Code for Plaintext (Unencrypted) Data

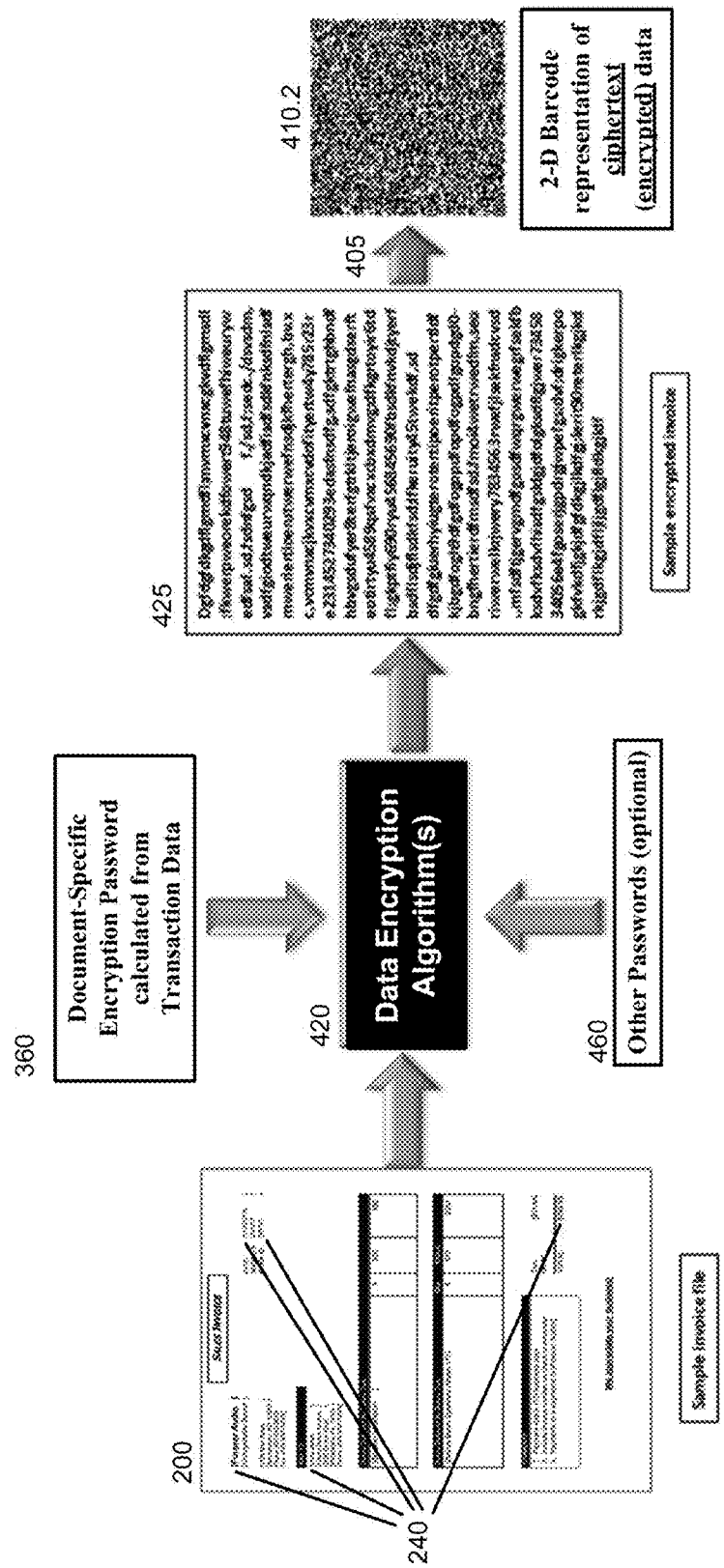
FIG. 4B   Generation of 2-D Barcode for Ciphertext Data

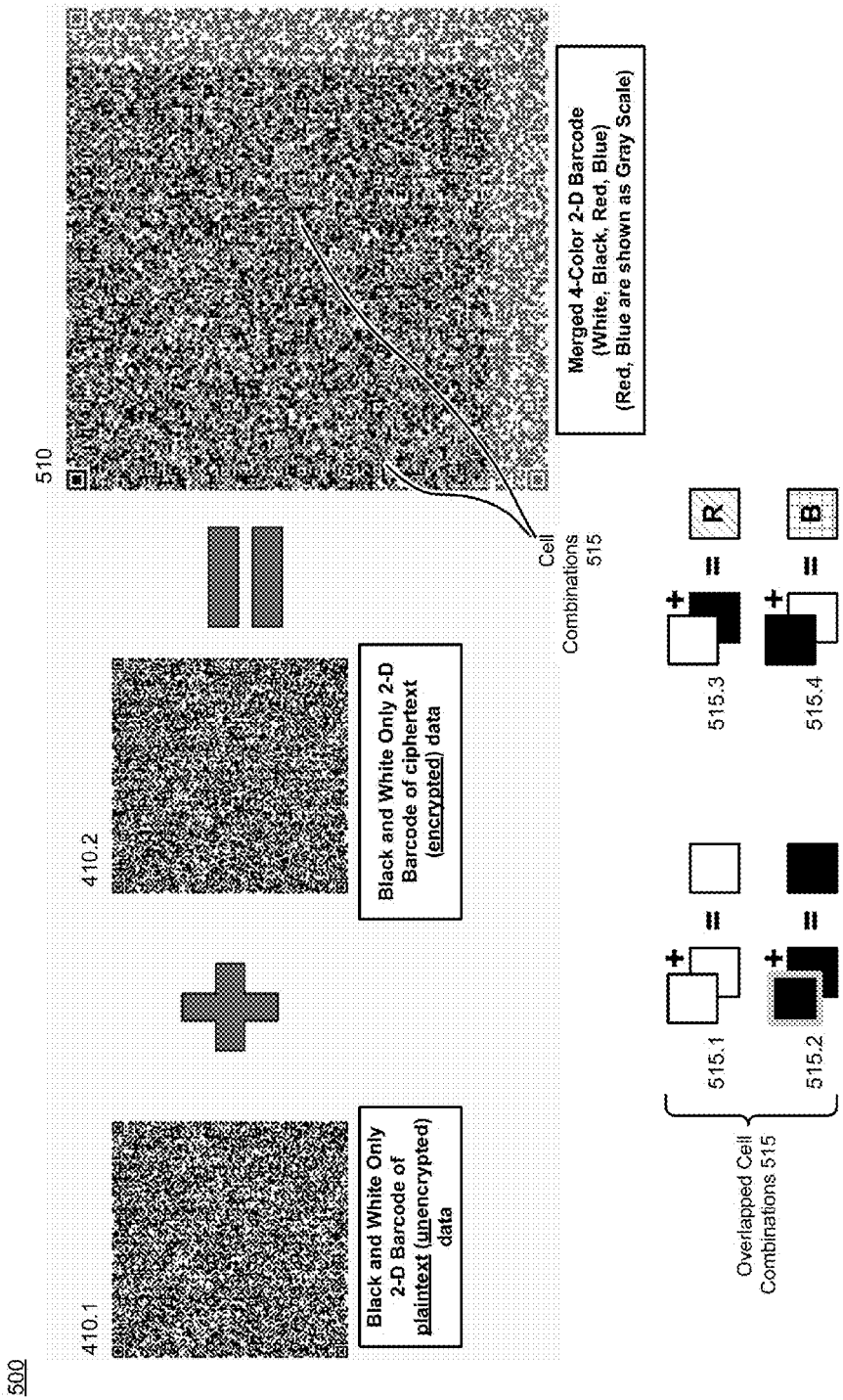

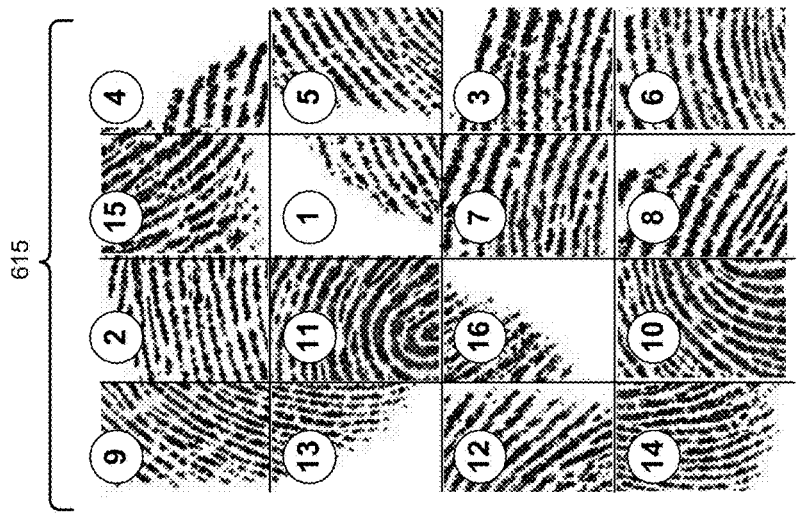
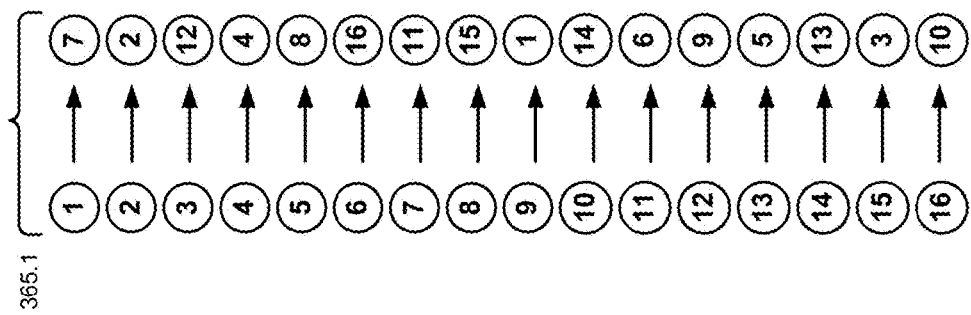
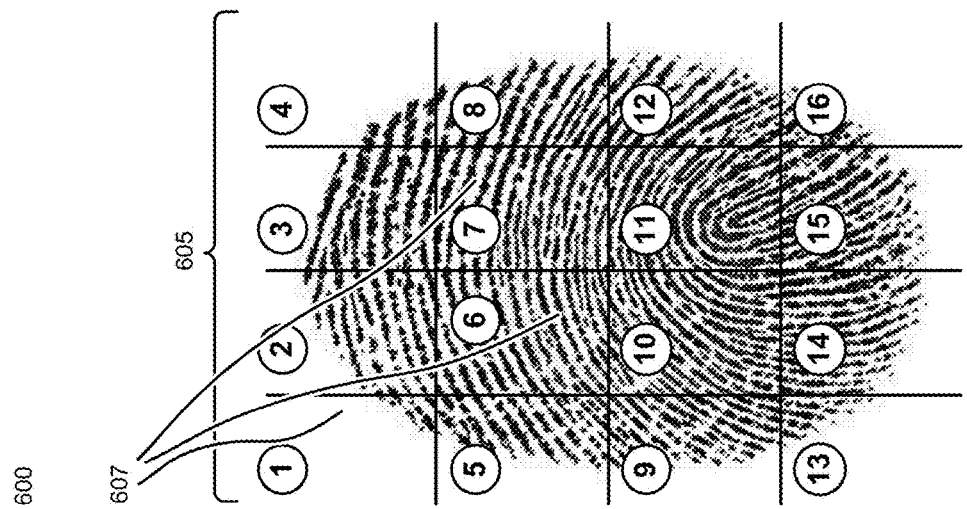
FIG. 6 Fingerprint Segment Shuffling

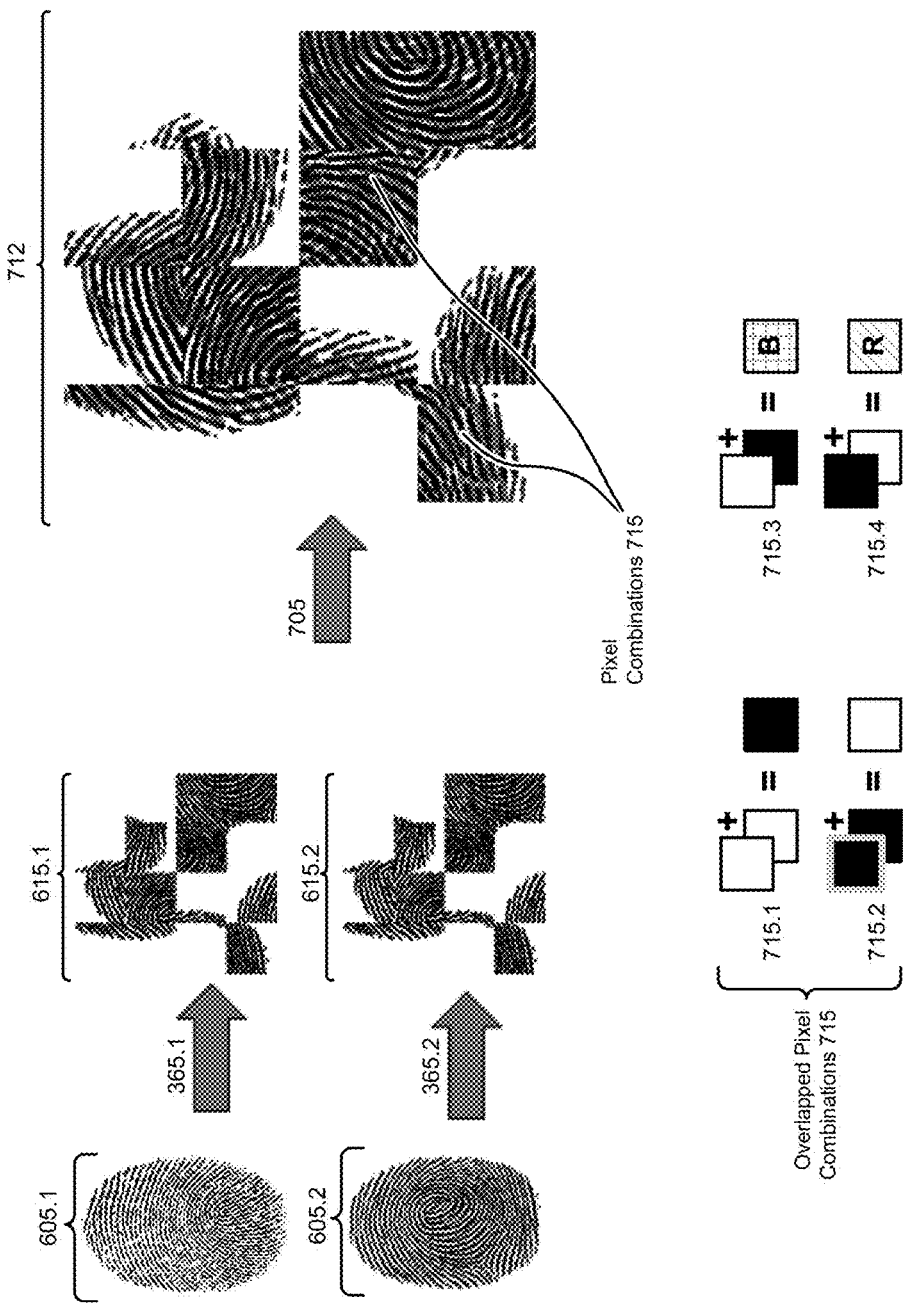
FIG. 7 Merger of Two Shuffled Fingerprints Into One Merged Image

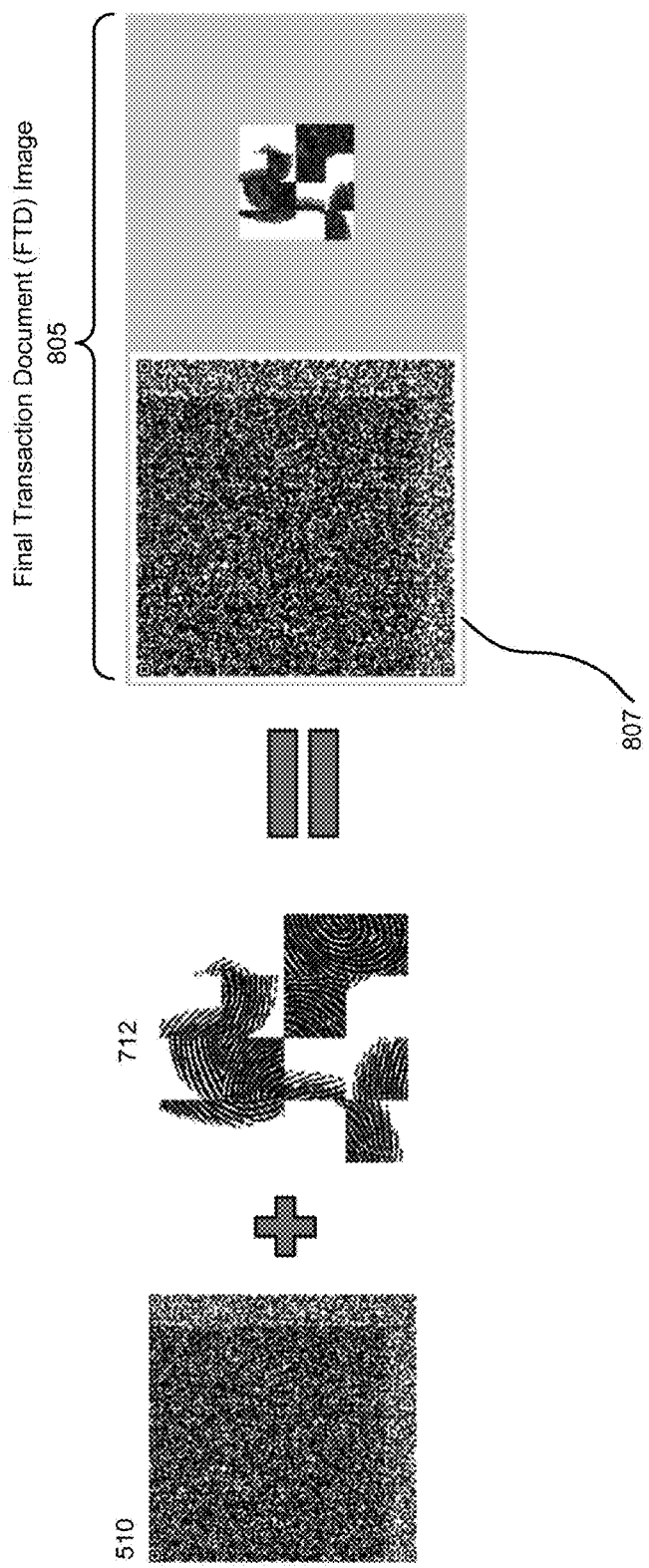
FIG. 8 Final Image Concatenation

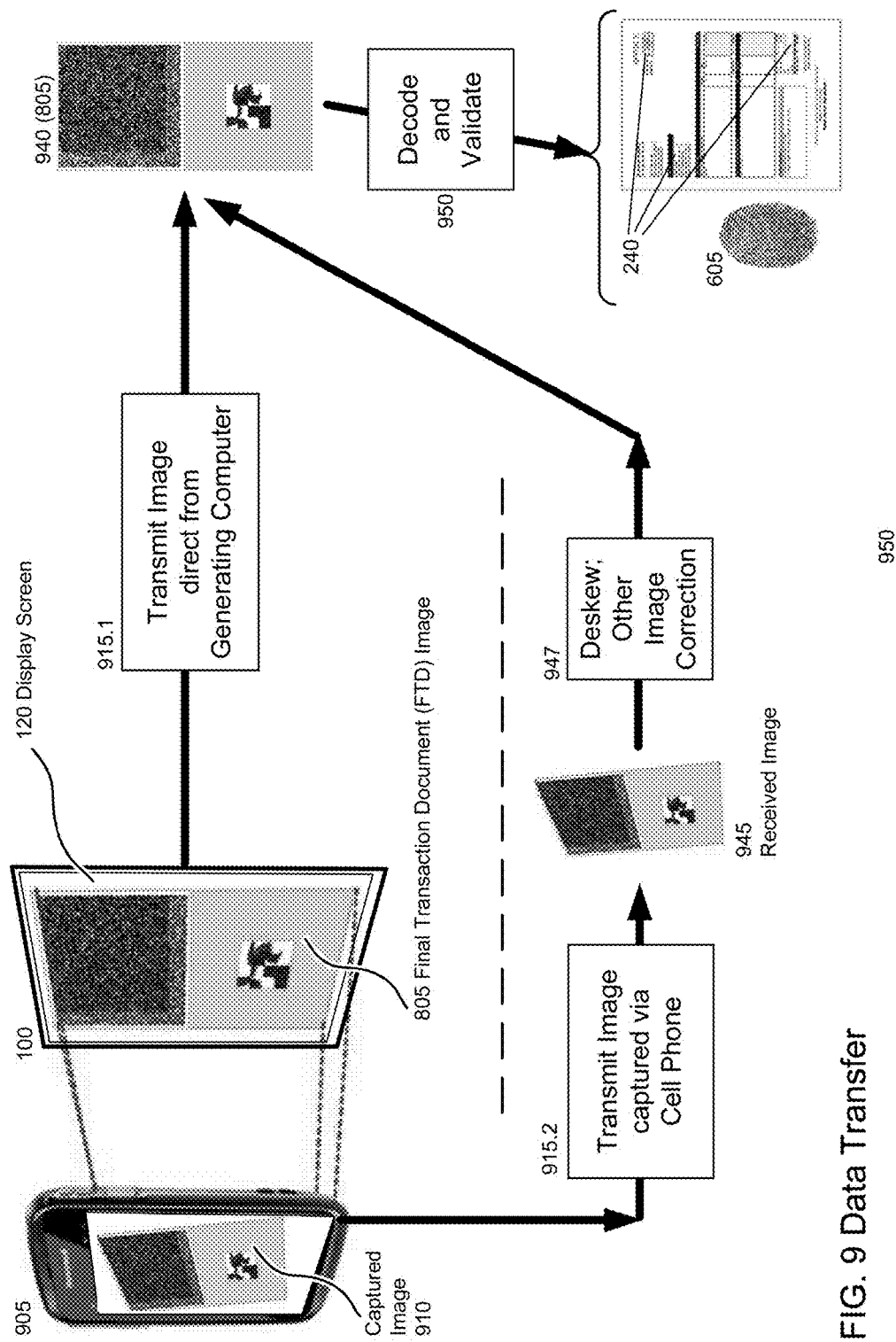
FIG. 9 Data Transfer

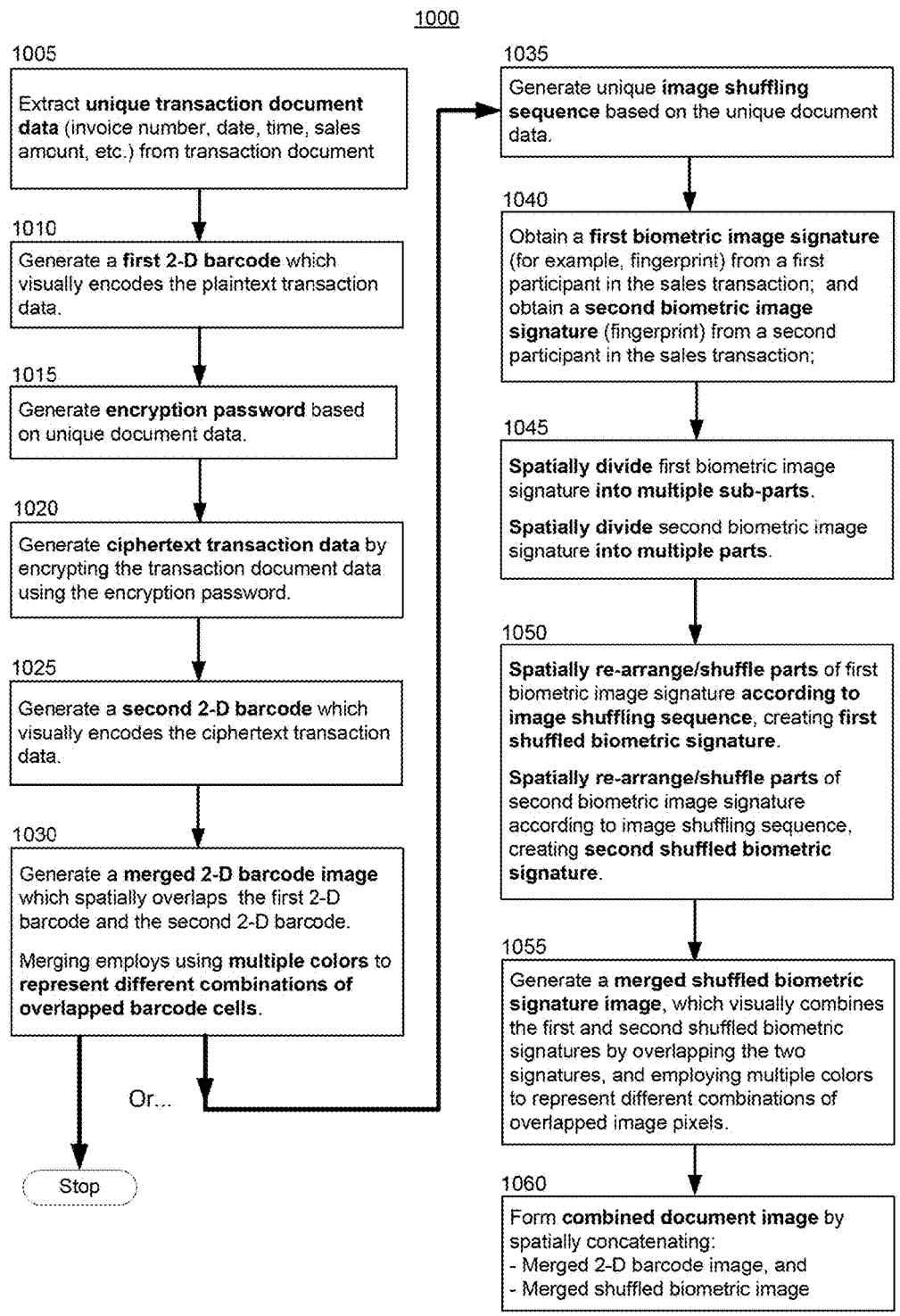

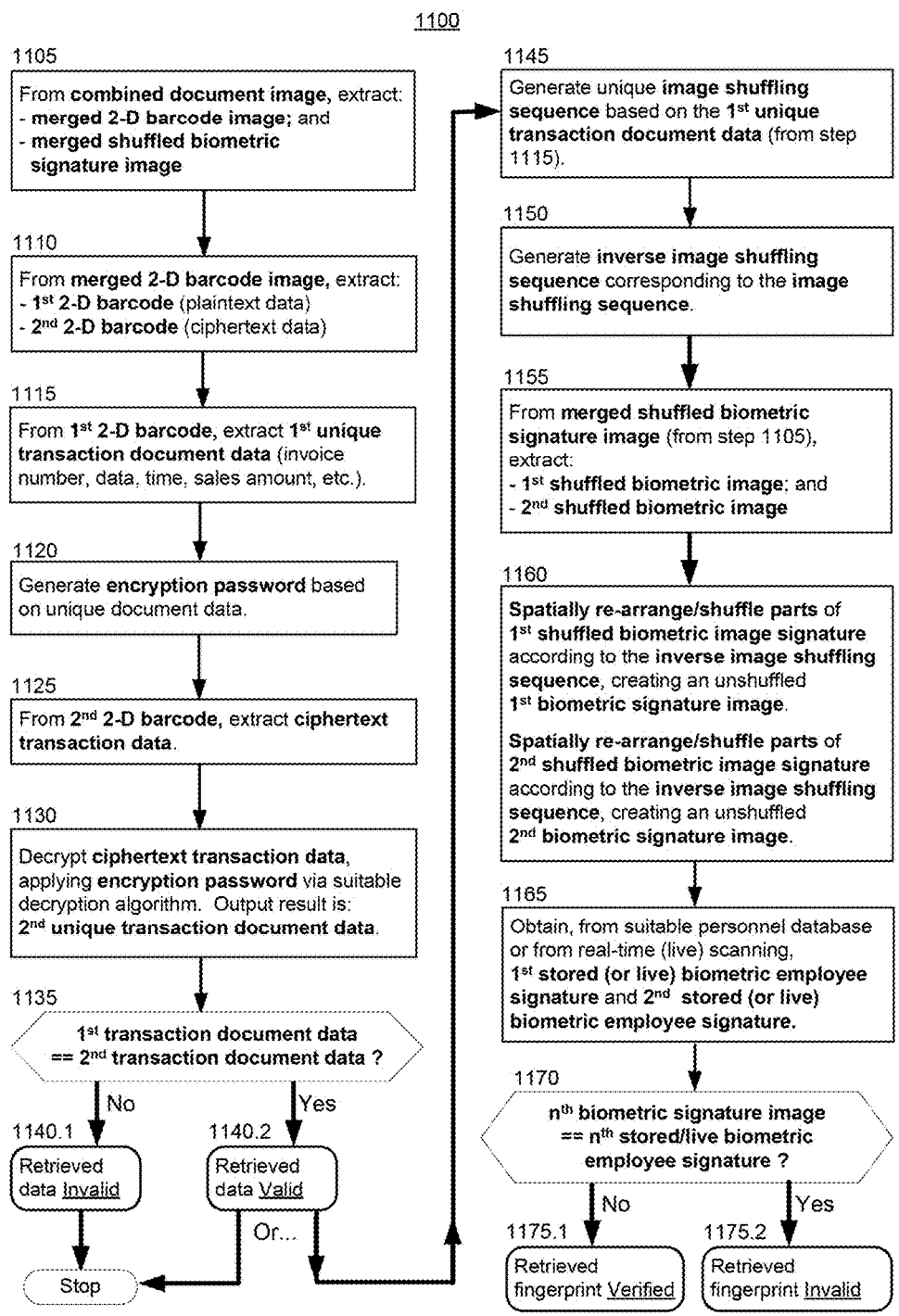

SECURE PAPER-FREE BILLS IN WORKFLOW APPLICATIONS

FIELD OF THE INVENTION

The present invention relates to sales billing. More specifically, the present invention pertains to invoices, sales receipts, and related transaction documents for business sales; the sales transactions may be transacted person-to-person for deliveries at retailer locations, factory locations, shop locations, and similar. The invention further relates to a system and method to eliminate printed paper invoices and printed sales receipts by employing secure, validated transmission of a purely digital/electronic bill (e-bill) of sale and/or sales receipt.

BACKGROUND

Workflow Applications.

Workflow applications are software applications which automate some or all of the steps of a business process. Typically, most business processes have some steps which require human input, such as entry of specific text or selection of specific values. Other steps can be automated and so be handled by the software application. For example, once a user has selected a product, the software may automatically insert a price; or once a user has selected or typed in a purchaser, a previously recorded purchaser address may be automatically filled in.

Product ordering, finance, and billing/payment processes are typically good candidates for workflow applications. For example, a purchase order within a single company may require authorizations from multiple departments. Such a purchase order can be initiated by a requesting party within the company, and then be forwarded electronically, via software, through multiple departments within the company. The requester of the purchase order can give the authorization when all required departments have approved. If a workflow application is strictly internal to one company, the integrity and the validity of the data processed by the application can often be readily maintained by a single workflow application (or by multiple applications which are designed as an integrated "team" of software elements).

Sales and Billing

Small sales and service transactions are often done "in the field", for example at a store where a product or service company (or a delivery service working on their behalf) delivers a product to a commercial enterprise or to a home. Such sales transactions typically involve hardcopy paperwork—for example, a bill of sales, a receipt, and/or electronic fund transfer authorizations (for example, credit cards or electronic checks). In such cases, both parties (seller and purchaser) typically need to exchange and retain valid copies of the pertinent documents.

These product/service sales and product/service billing situations provide another business context where workflow applications may be appropriate and helpful. A complication arises in such cases, however, because here the paperwork (which may be substantial in volume) is typically between different companies or organizations—typically between a purchaser and a seller. As a result, the paperwork—whether actual paper, or digital "paperwork"—is not internal to any one organization. Creating copies for each separate party, and establishing, maintaining, and validating the data integrity and security of paperwork exchanged between different companies, may then be a significant challenge.

Direct Store Delivery (DSD).

As noted above, paperwork exchanges may occur outside of an office context, adding a further challenge to maintaining data integrity and validation. Consider for example direct store delivery (DSD) applications. In deliveries from a distributor or product manager directly to a store (or home consumer or other off-business-site customer), purchase orders, bills, and payments may all be exchanged at a consumer's front door, at a loading dock, or in the lobby/reception area of an office or factory.

In DSD applications, the DSD driver provides the bill (invoice) of delivered material to the store keepers (or retailers, or home consumer). That bill amount will be paid instantly or later. Store keepers (or retailers) may also provide some kind of receipts to DSD drivers. These bills and receipts exchange happen in-the-field, at retailer location.

In all these transactions there is great deal of paper work involved, and typically both the parties exchange their bills physically. For customary record-keeping purposes, DSD suppliers (or DSD drivers) should maintain all these bills (invoices) and receipts for about ten to twenty years.

DSD as an Example of Workflow Applications:

In this document, many examples, applications, and exemplary methods may be based on exemplary Direct Store Delivery (DSD) use cases or DSD contexts. It will be noted that DSD examples and use cases are employed for purposes of illustration. The present system and method may be applied broadly to many different applications and contexts where transactional documents are employed, agreement documents are employed, or more generally to many types of workflow paperwork. Similarly, throughout this document, references to DSD persons or contexts, such as "DSD drivers", may be understood to refer more broadly to any personnel engaged in workflow activities.

Advantages of Paper Bills and Receipts (Hardcopy)

Still paper bills and receipts are used due to the following advantages:

Paper bills and receipts cannot be tampered with easily. If they are tampered with, that can generally be readily ascertained through visual inspection.

Easily detectable forgery signatures: Bills and receipts are generally validated through hand-written signatures. Legitimate hand signatures leave signature pressure lines on the papers. This can be used to ascertain and identify the forgery signatures.

Company Stamps—which are physically stamped onto the paper—are also considered as the authentication sign of the company(s) or parties involved in the transaction.

Hardcopy paperwork is a familiar and established way of conducting business.

Disadvantages of Paper Bills and Receipts (Hardcopy)

Paper bills, paper receipts, and other physical hardcopy have distinct, substantial disadvantages as well.

Daily bill submissions: DSD drivers (or any workflow staff-persons) need to collect all bills for each day from the other parties to the sales transactions, and the DSD drivers must submit the bills to a home office or central office. If even one bill is misplaced, that may lead to billing and record-keeping inconsistencies.

Bill preservation and searching of bills: Workflow organizations (for example, DSD suppliers) need to preserve the bills for an extended time. If there are many bills, then it is very difficult to maintain all the paper records and to search for specific bills.

Bills can not be duplicated or recovered: Old bills can not be duplicated with same kind of features as the original bill. If the bills are torn or otherwise in a non-usable state, then recovering the bills to the same state as the original bill may be difficult or impossible.

Electronic Scanning and Storage (Softcopy)

Pure usage of paper bills and paper receipts has the disadvantages noted immediately above. For this reason it has become common to have paper documents scanned and stored electronically. However, this solution presents problems as well.

Cost of scanners, printers, papers: In Workflow applications, such as direct sales delivery (DSD), both the parties to the transaction (bill distributor and bill receivers) should have the scanners and printers at the location where business is transacted, for example at individual stores. There is some cost involved in purchase of scanners, printers, toner, and the paper itself.

Carrying scanners, printers, and papers: In some of the workflow applications, the bill distributor (typically the seller or delivery service for a product or service) needs to bring along scanners, printers, and papers during business travel. Carrying and handling of these items (along with the actual goods for sale) adds an extra burden for the delivery or service personnel.

Not environmentally friendly: Scans originate from paper. Using paper is not good for the environment, since paper is made from trees.

Tampering: Scanned copies, such as Portable Document Format (PDF) copies of printed bills and receipts, may be easily altered. For example, a scanned copy could be altered before transmission from one location to another, with the recipient having no way to know the PDF file was altered. In some embodiments, the present system and method addresses this deficiency.

Bill searching: Scanned copies are typically image copies, and cannot be readily searched for text or numeric data. Text recognition may be performed on such documents, but this requires extra processing. Further, handwritten information, as may be written on a print document by persons engaged in a sales transaction, often does not lend itself to reliable text recognition.

Transaction Validation Challenges

Sales documents, bills, and receipts are typically validated by the parties involved in the transactions. This conventionally involves signatures, which may be done by pen-and-ink on paper, and which can then be scanned; validation is also done increasingly by signature by stylus on a contact sensitive electronic display screens/tablets. Even these approaches have disadvantages, especially for documents which must be transmitted from one party to another.

Signature validation: Signatures captured from paper by a scanner will not be same as actual signatures (since they lack the indentations made in paper by actual signature), and so may be less reliable for signature validation. Signatures which are originally captured electronically on tablets could easily be digitally "swapped" with false signatures by a malicious party.

Tampering: Softcopy, such as PDF scans of printed and hand-signed documents, can be tampered and altered easily (with the possible exception of cases where digital signatures are not used).

Digital Signatures and Digital Watermarks

Another method used for document validation is a digital signature, which is a mathematical process to demonstrate the authenticity of digital documents (for example, to authenticate PDF scans of print bills and receipts). Digital signatures can be validated mathematically by a recipient, which provides the recipient with a degree of confirmation the message was created by a known sender (authentication), that the sender actually sent the message (non-repudiation), and that the message was not altered in transit (integrity).

Here again, however, there are disadvantages with digital signatures.

Digital signature requires keys (specific sequences of digital symbols) from 3rd parties, which involves some cost.

If a printout of the finished document is made, the printed document does not retain the digital signature. This confines validated document use to electronic use only, when hardcopy may at times be preferred during some processing. If a picture of the transaction document was taken from other device (like mobile phone or camera), digital signatures will again not be retained.

If either a public or private key is changed, then the document sender (typically a seller or bill distributor) needs to maintain all the previous keys as well.

If the public and/or private key is changed, then validating the old signed documents becomes a difficult process.

Digital signatures validity is less than 10 years. If any document needs to be retained for more than 10 years, digital signature does not provide a security solution.

If, over time, a decision is made to change the encryption and/or decryption algorithms, then validating the old signed documents is again not an easy process, and new validation algorithms need to be adopted by both the sender and recipient(s) of billing documents and receipts.

There are problems with digital watermarks as well. For example, if the watermark is corrupted, that may corrupt the entire data file.

What is needed, then, is a system and method for recording financial transaction documents (such as sales bills and receipts) in the field at the point of sale/transaction, at the time of sale/transaction. The system and method should be entirely digital, avoiding paper altogether; and once the document is sent electronically, the system and method should provide for robust data validation at the receiving end. The system and method should also be practical, convenient and robust, employing digital validation processes which enable secure duplication and electronic transmission of the documents in a manner which is highly reliable, readily validated, and relies essentially only on data inherent in the transaction itself, without the need for third-party keys or validation algorithms (which can be modified for various reasons).

SUMMARY

Accordingly, in one aspect, the present invention embraces both portable hardware (tablet computers and/or cell phones, and similar) in conjunction with software, which completely replaces paper billing and receipts for DSD and for similar applications where paper or paperless documents are required to establish, confirm, or support some kind of mutual agreement between two parties. The mutual agreement may entail numeric data pertaining to finance or sales, but may also be any other kinds of agreements between two parties, and which has unique document data.

The system and method allows for paperless billing and paperless receipt document exchanges, with inherent document verification, between any two parties (such as seller and purchaser) who are at same location. The system and method enables the parties to exchange the transaction data through Bluetooth, USB or any wireless or wired communication. This system and method even works if the parties want to share data (that is, bills, receipts) by taking pictures of documents (for example, taking pictures via their cell phones).

In an embodiment, the system and method entails employing the unique data values which are inherent in a particular transaction document (such as data from a bill of sale) to create to visual representations such as two-dimensional (2-D) bar codes or matrix codes.

The document data is first encrypted to ciphertext according to a password which itself depends on the unique document data. A first 2-D barcode is then generated, which directly represents the document data, according to standard matrix coding algorithms. A second 2-D barcode represents the document data in the encrypted form. This creates a unique visual encoding/encryption specific to the particular transaction document.

Finally, the two 2-D barcodes are overlapped to form a single, color visual barcode-like representation, employing multiple colors for various combinations of overlapped cells, according to a cell mixing algorithm.

At a receiving end, the two original 2-D barcodes can only be separated by software which employs a proprietary, reverse algorithm to extract the two black and white 2-D barcodes from the combined color code. One of the two retrieved 2-D barcodes, which stored the document data in plaintext form, is then used to retrieve the original document data. The other retrieved matrix symbol has the ciphertext document data.

The original document data is then employed to generate a second ciphertext 2-D barcode, according to the same algorithm employed above. If the two 2-D barcodes—the original and the newly generated—are a match, this indicates that data integrity has been maintained. If the two 2-D barcodes—original and newly generated—are not a match, this indicates that data integrity has been lost or tampered with.

In an embodiment, the system and method employs fingerprints from the transaction participants for document signatures or validation. The system and method entails employing the unique data values for the particular transaction document (such as data from a bill of sale) to generate a unique fingerprint shuffling sequence.

Each fingerprint, from each transaction participant (for example, seller and buyer), is broken into multiple image parts. For each fingerprint, these images parts are then spatially shuffled according to the unique fingerprint shuffling sequence.

Finally, the two shuffled fingerprint images are combined into a single, overlapping visual representation, employing multiple colors, according to a proprietary image overlap algorithm.

At a receiving end, the fingerprint shuffling sequence can be recovered from the original document data. At the receiving end, the two original shuffled fingerprint images can then be separated by software which employs a proprietary, reverse shuffling algorithm. This employs a reverse shuffling sequence to extract the two original black and white fingerprints from the combined, color shuffled fingerprint. The fingerprints can then be validated against separately stored records of fingerprints of the appropriate parties.

BRIEF DESCRIPTION OF THE DRAWINGS

FIG. 1 is a system diagram of an exemplary electronic device according to the present system and method.

FIG. 2 illustrates an exemplary sales invoice with unique sales data.

FIG. 3. is a flow chart of an exemplary method for creating a password, an image shuffling sequence, or other encryption-related data values for a document, where the encryption-related data value(s) is based on unique document content.

FIG. 4A is a schematic representation of the conversation of plaintext alphanumeric transaction data to a 2-D barcode.

FIG. 4B is a schematic representation of the conversation of ciphertext transaction data to a 2-D barcode.

FIG. 5 schematically illustrates an exemplary method for merging a first 2-D barcode and second 2-D barcode into a merged 2-D multicolor barcode image.

FIG. 6 illustrates an exemplary method to convert a graphical biometric signature, such as a fingerprint image, into a spatially shuffled image of the biometric signature.

FIG. 7 schematically illustrates an exemplary method for merging a first shuffled biometric image and a second shuffled biometric image into a merged multicolor biometric image.

FIG. 8 illustrates concatenating a 2-D barcode data image and a biometric signature image into a combined final document image.

FIG. 9 illustrates methods for direct transmission and for indirect transmission of a graphical image which encodes data, and also for decoding and validating the received graphical image.

FIG. 10 is a flow-chart of an exemplary method to encode commercial transaction data and transaction signatures into a secure, self-verifiable image format.

FIG. 11 is a flow-chart of an exemplary method for data recovery from a secure, self-verifiable transaction image and for validation of the recovered data by a receiving party.

DETAILED DESCRIPTION

In the following description, certain specific details are set forth in order to provide a thorough understanding of various embodiments. However, one skilled in the art will understand that the invention may be practiced without these details. In other instances, well-known structures associated with computers, tablets, cell phones, or with other digital devices, and/or with data display, and/or with data storage or data transmission, have not been shown or are not described in detail to avoid unnecessarily obscuring descriptions of the embodiments.

Unless the context requires otherwise, throughout the specification and the claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the claimed invention.

Reference Numbers: Reference numbers are used throughout the figures. The first digit of a reference number generally indicates the first drawing where the associated element appears. For example, an element with reference number "207" first appears in FIG. 2.

In some instances, an element may be shown in both a generic form and a more specific form or species; in these cases, the specific form or species may be indicated by an appended period (".") followed by a digit or digits to distinguish a species of the general form. For example, a general fingerprint image may have a reference number of 605; while a first fingerprint image of a first person may have a reference number 605.1, and a second fingerprint image of a second person may have a reference number of 605.2.

In this document, an exemplary sales invoice is used to as an example to illustrate an exemplary transaction document. Persons skilled in the relevant arts will appreciate that the present system and method may be applied to any document which needs to be protected from tampering.

Portable Data Receiving and Display System (Tablet)

The present system and method may enable recording of date pertaining to workflow transactions, including financial and sales data such as sales transaction data, at a field location such as a retail store. Sales transactions are just one exemplary case of many possible applications of the present system and method. The present system and method is not limited to sales, and persons skilled in the relevant arts will appreciate that the present system and method can be employed with and applies to many kinds of workflow transactions.

The present system and method may employ a portable computing system or processing system, such as a tablet computer 100, to record, store, display, and transmit data. The data may include both numeric and text data, and also graphical or image data, such as an image of a human fingerprint captured via a biometric scanner. The biometric scanner may be an internal module, or may be an external (stand-alone) device which may be coupled to the tablet computer 100 via a wired or wireless link.

Other related technologies may be employed as well, including: a dedicated portable electronic system for sales, invoicing, and receipts; cellular phones; smart phones; personal digital assistants; vehicle-mounted computers; stationary (e.g., desktop) computers; or distributed computers (e.g., network systems).

FIG. 1 schematically depicts a system diagram of an exemplary electronic tablet 100, such as a portable tablet computer 100, according to the present system and method. Tablet 100 according includes a processor or microprocessor 105, dynamic memory (RAM) 107, and user interface elements. RAM 107 is configured to store computer code or instructions which enable processor 105 to perform the present system and method in accordance with methods and steps described further below in this document. RAM 107 is also configured to store data which may change dynamically in the course of implementing the presenting system and method, including for example transaction data and image or graphic data which may be generated by the present system and method.

Tablet 100 may employ static memory 109 for long-term storage of operating instructions, an operating system, and long-term data storage. Static memory 109 may include Read-Only Memory (ROM), also known as non-volatile memory (NVRAM), a hard disk drive, flash drives and other removable-but-non-transitory storage, CD ROMs, PC-CARDs, memory cards, and/or other non-transitory storage media and code storage media as may be developed in the future.

Tablet 100 may also include one or more wireless communication systems 115. These wireless systems 115 may enable communication with other electronic devices and with computer networks via wireless networks according to such protocols as Bluetooth, WiFi, cellular communications, a local area network (LAN), an ad hoc network, a cellular network (e.g., a GSM network, a CDMA network, or an LIE network), and other protocols and wireless systems well known in the art or yet to be developed.

Tablet 100 may also include ports (not shown in FIG. 1) and suitable electronic support for wired communications 111 via USB, Ethernet, and other protocols known in the art.

Tablet 100 according to the present disclosure may include a display monitor 120 for display of user data and graphical images, and also for display of elements such as menus, dialog boxes, and display buttons which enable or facilitate user control of the present system and method.

Tablet 100 may include a keyboard 130 for entry of text and numeric data. In an alternative embodiment, display and keyboard functions may be integrated into a touch-screen (or pressure-sensitive) display 120 as is well known in the art.

Tablet 100 may include a mouse or touch-pad 140, also well-known in the art, for further control of a display pointer and other elements visible on monitor 120. In an alternative embodiment, mouse functions may be integrated into a touch-screen display 120 as well.

Tablet 100 may include audio user-interface elements 150 as well. These may include speakers, headphones, and/or a microphone. The microphone may be configured to receive verbal input from a user, and suitable software or firmware may translate the audio input into text and numeric data to be displayed on display 120, or may translate the audio input into control commands to operate tablet 100 according to the present system and method.

Other elements and means for user input and output, such as eye-glasses with optical tracking and interaction capabilities, or holographic display and interaction systems, may also be envisioned within the scope and spirit of the present system and method.

Tablet 100 may include a biometric sensor 160. Biometric sensor 160 may be used to identify a user or users of device 100 based on unique physiological features. In an embodiment, biometric sensor 160 may be a fingerprint sensor used to capture an image of a user's fingerprint. In an alternative embodiment, biometric sensor 160 may be an iris scanner or a retina scanner configured to capture an image of a user's iris or retina. As noted above, in an embodiment biometric sensor 160 may be an internal module of tablet 100. In an alternative embodiment, biometric sensor 160 may be an external (stand-alone) device which may be coupled to tablet computer 100 via a wired link (e.g., USB) or wireless link (e.g., Bluetooth connection).

In an embodiment of the present system and method, tablet 100 may include a camera 170 for capture of images. In an embodiment, camera 170 may be used to capture images of documents, such as sales transaction documents, which may be displayed on paper or by other electronic devices. In an embodiment, camera 170 may serve multiple roles, including serving effectively as biometric sensor 160 for the capture of user fingerprints, iris scans, retinal scans, or even facial images of parties to a sales transaction.

The processor 105 is communicatively coupled via a system bus 195 to memory 107, NVRAM 109, wired connections 111, wireless transceivers 115, monitor 120, keyboard 130, mouse 140, audio I/O 150, biometric sensor 160, camera 170, and to such other hardware devices as may be necessary or helpful to implement the present system and method. Tablet 100 includes suitable electronic support for bus 195 to mediate interactions between all elements of device 100.

Typically, processor 105 is configured to execute instructions and to carry out operations associated with the tablet 100. For example, using instructions retrieved from the memory 107 (e.g., a memory block) and/or static memory 109, processor 105 may control the reception and manipulation of input and output data between internal components of the tablet 100. Processor 105 typically operates with an operating system to execute computer code and to produce useful data. The operating system, other computer code, and data may reside within memory 107 and/or memory 109 that is operatively coupled to processor 105 via bus 195.

The operating system, other computer code, and data may also be hard-coded into tablet 100 either as dedicated logic within processor 105 or as non-volatile memory known as firmware 109.

In an embodiment, the instructions and data employed by the electronic device may be organized into one or more software modules, firmware modules, drivers, or other programs. Such modules may be implemented, in whole or in part, as one or more of: dedicated logic in processor 105; firmware 107; and dedicated, specialized processors (not shown in FIG. 1).

Exemplary modules which may be employed may include:
- a password generator to generate unique passwords based on selected input data;
- a sequence generator to generate a sequence of numbers based on selected input data;
- a 2-D barcode generator to generate two-dimensional (2-D) barcodes codes (such as matrix codes) from text and numeric data;
- image processing modules configured to superimpose, to spatially rearrange, and/or color-adjust images or portions of images; and
- a random number generator which generates random numbers (or pseudo-random numbers).

It will be understood by persons skilled in the relevant arts that the above indicated modules may employ any of several algorithms and methods well known in the art, or may employ new or novel methods yet to be developed.

Transaction Documents (Bills, Receipts, Contracts)

The present system and method is explained herein largely with reference to an exemplary sales transaction and in particular an exemplary sales invoice 200. This is to be understood as being by way of example and illustration only, and should not be construed as limiting. The present system and method is applicable to many different types of documents and records which record or in other ways pertain to or may be associated with mutual agreements between two parties, including for example and without limitation: contracts, bids, licensing agreements, proposals, technical specifications, requirements documents, service agreements, parts lists, deeds, liens, letters of understanding, title documents, receipts, easements, and covenants.

FIG. 2 illustrates an exemplary sales invoice template 200 (also referred to herein, interchangeably, simply as the "sales invoice 200") which is populated with exemplary sales data values 240. The data 240 may be seen for example on a display screen 120 of portable tablet computer 100. Display screen 120 may be configured to display the invoice template 200 which can be updated with new, unique data 240 as new sales transactions occur. Display screen 120, and in particular invoice 200, may also be configured to accept data entry either directly on display 120 (for example via touchscreen entry), or via a keyboard 130, audio input/output 150, or other means.

Template 200 may include various display buttons, menus and other user-interface elements, not shown in FIG. 2, to facilitate entry and updating of new values. For example, a [New] button or icon may indicate that the template should be cleared so that a new transaction may be recorded, or a [Save} button or icon may indicate that newly entered data should be saved in memory 107. Other data- and transaction-oriented interface elements, known in the art, may be present as well.

In practical, real-world application, each transaction bill (invoice) or receipt will likely have some kind of unique and critical information. Normally each company maintains the predefined bill and receipt templates 200 (or bill and receipt formats 200) so that new transactions can be defined in the field, as needed.

Multiple unique transaction values 240 may be combined into a single data set which is itself unique. Further, through various algorithms, a unique data set may be employed to generate a unique encryption key or password (see FIG. 3 below), a unique sorting sequence (see FIG. 3 below), or other unique values, as discussed further below.

Examples of transaction data 240 which are typically essential to each transaction, and which are unique or distinctive may include, for example without limitation:
- Date with Time (240.1)
- Invoice Number (240.2)
- Total Amount Due (240.3)

Persons skilled in the art will recognize that some such data may not be universally unique, but will have widely varying values across many transactions. For example, a Total Amount Due 240.3 may occasionally have the same exact value in two completely separate transactions, but will generally vary greatly from one transaction to another, and may have a very large range of possible values.

Other invoice values may be common between multiple transactions, but may be unique between different vendors or customers. They may be referred to as "semi-unique transaction values" or "distinctive transaction values". These collectively may still be used as elements of a combined data set which is, in totality, unique among all commercial transactions. Additional invoice values which may be employed within the scope of the present system and method include, for example without limitation:
- Sender ID (240.4)
- Name of the Sender (Distributor) (240.5)
- Name of the Receiver (240.6)
- Receiver Company Name (240.7)
- Receiver Company ID (not shown in FIG. 2)
- Receiver Company phone number or e-mail (240.8).

The above identified transaction values 240 are exemplary only. Other billing, receipt, and transaction values 240 may be employed as well on transaction template 200. These exemplary values 240, and similar values, are the parameters are identified in transaction template 200. These parameters 240 may be employed for generating passwords and some of other required elements of the present system and method, as discussed further below.

Generation of a Document-Unique Password and Shuffling Sequence

FIG. 3. is a flow chart of a generalized method 300 for creating a password 360, an image shuffling sequence 365, or some other signature data value which is substantially unique and distinct for a given document, such as a sales invoice 200.

In step 305 of method 300, designated critical transaction data values 240 are extracted from a sales invoice, bill, receipt, or similar transaction document 200. Exemplary transaction values 240 were discussed above in conjunction with FIG. 2. These values 240 serve as parameters 240 for password and shuffling sequence generation.

In step 310 of method 300, the extracted data values 240 are provided as input parameters 240 to suitable algorithms 350 for key generation. Key generation algorithms 350 may include, for example and without limitation a password generating algorithm 350.1 or an image shuffling sequence algorithm 350.2. Other algorithms may be employed as well.

In an embodiment, the present system and method employs one or more unique (that is, proprietary, not-publicly known, not-commercially available, not open-source, etc.) key generation algorithms 350 for enhanced data security. General design methods and principles for the development of such algorithms are known in the art, and so specific, possible proprietary algorithms 350 are not discussed here.

In an alternative embodiment, the present system and method employs one or more publicly known, commercially available, or open-source key generation algorithms 350.

In an alternative embodiment, multiple encryption algorithms 350 may be employed (with the same algorithms or different algorithms), applied for example consecutively, and employing either of general (known) encryption algorithms or proprietary encryption algorithms, or both.

In step 315 of method 300, the algorithm(s) 350 output one or more unique keys or key sequences 360,365 which are to be employed for data encryption, as described further below in this document. Such keys may include, for example and without limitation:

one or more unique encryption passwords 360 or encryption keys 360 to be employed as part of a process for encrypting text and/or numeric data; and an image shuffling sequence 365, such as a fingerprint shuffling sequence 365, which may be employed to spatially shuffle parts of an image into an apparently random or pseudo-random order. The sequence may map a default, ordinal ordering of spatial elements (1, 2, 3, 4, etc.) to an apparently random spatial ordering sequence (for example, 5, 2, 11, 3, etc.). Shown in FIG. 3 is an exemplary specific fingerprint shuffling sequence 365.1. The sequence 365.1 shown is arbitrary and purely for illustration, and many other sequences may be generated by the present system and method.

In an embodiment of the present system and method, additional or alternative sequences or patterns may be generated as well from the unique document data. For example, in addition to shuffling sub-parts of a biometric image, parts or segments of a biometric image may be flipped (horizontally and/or vertically) as well, or rotated; the present system and method may generate suitable flip or rotation sequences, or other image alteration patterns, as required, from the unique document data.

Generation of 2-D barcodes for Transaction Data (Plaintext and Ciphertext)

In an embodiment, the present system and method generates two visual representations of transaction data 240. The first geometric representation 410.1 is of the data 240 in its native (unencrypted or plaintext form), while the second geometric representation 410.2 is of the data 240 in an encrypted form (also referred to as "ciphertext" 425, see FIG. 4B below).

In an embodiment, the geometric representation 410 is in the form of a two-dimensional barcode. In an embodiment, the geometric representation 410 is in two colors only, or "monochrome", the two colors often being (as is conventional in the art) black and white. More generally, in an embodiment, the geometric representation 410 is in two colors only, or "monochrome", one being a first high intensity color and the second being a second low intensity color, so as to provide a strong intensity contrast for clarity of scanning.

In an embodiment of the present system and method, the 2-D barcodes 410 may be QR codes 410. In alternative embodiments the geometric representations may take other forms well known in the art, such as Aztec codes, Data Matrix, MaxiCode, PDF 417, stacked (multi-row) barcodes, or other such two-dimensional geometric codes known or yet to be developed.

In this document, the terms "barcode" 410, "two dimensional barcode" 410, "2-D barcode" 410, "geometric data representation" 410, "matrix code" 410, and "QR code" 410 are used interchangeably to reflect geometric representations of alphanumeric data 240 which are typically two-dimensional, though in some embodiments may be strictly linear (one dimensional).

2-D barcode for Plaintext (Unencrypted) Data:

FIG. 4A is a schematic representation of the conversion of alphanumeric transaction data 240 to a first 2-D barcode 410.1 according to an embodiment of the present system and method. In an embodiment, the present system and method extracts the unique transaction data 240 from the invoice, bill, or other document 200 for the transaction. (In an embodiment, the transaction data 240 may already have been extracted to create a password, as described above in relation to FIG. 3. Such transaction data 240 may then be readily available, for example, in memory 107 of tablet computer 100.)

In an embodiment, the transaction data 240 is then processed according to known algorithms 405 for generating 2-D bar codes 410, such as a QR code or other matrix code, stacked barcode, etc. In an alternative embodiment, a proprietary conversion algorithm 405 may be employed to generate a proprietary 2-D barcode 410. In FIG. 4A, the algorithm is represented schematically by an arrow 405. Such known algorithms 410 will be well understood by persons skilled in the relevant arts, and are not covered in detail here.

The result is a first 2-D barcode 410.1, which encodes the plaintext transaction data 240, that is, the transaction data without encryption. Persons skilled in the relevant arts will recognize that the transaction data 420 may be readily recovered from 2-D barcode 410 through decoding algorithms generally known in the art, or through a proprietary decoding algorithm for a proprietary 2-D barcode.

2-D Barcode for Ciphertext (Encrypted) Data:

FIG. 4B is a schematic representation of the conversion of alphanumeric transaction data 240 to a second 2-D barcode 410.2 according to an embodiment of the present system and method. In an embodiment, the present system and method extracts the unique transaction data 240 from the invoice, bill, or other document 200 for the transaction. (In an embodiment, the transaction data 240 may already have been extracted in previous steps. Such transaction data 240 may then be readily available, for example, in memory 107 of tablet computer 100 or any other applicable processing device.)

In an embodiment, the unencrypted transaction data 240 (generically referred to in the art as "plaintext") is encrypted using an encryption algorithm 420 or algorithms 420. In an embodiment, the encryption algorithm 420 will employ, as a key or password, the encryption password 360 previously calculated from the transaction data 240 (see FIG. 3 above). In this way, the data encryption process is specifically keyed or tied to the unique plaintext transaction data 240 for the specific transaction under consideration.

The output result is an encrypted transaction data 425 (generically referred to in the art as "ciphertext"), which may be ciphertext invoice data 425, ciphertext receipt data 425, or other ciphertext transaction data 425. In an embodiment, the ciphertext data 425 is generally not understandable or meaningful as presented, and in an embodiment ("private key") can generally only be read if first decrypted employing the same encryption password 360.

In an embodiment, the encryption algorithm 420 may be any of several known algorithms, including for example and without limitation: Pretty Good Privacy (PGP), Triple DES, RSA, Blowfish, Twofish, and AES. In an alternative embodiment of the present system and method, a proprietary encryption algorithm 420 may be employed.

In an alternative embodiment of the present system and method, additional encryption passwords 460 may be employed in addition to the encryption password 360 calculated from transaction data 240. In an embodiment, one or more additional encryption passwords 460 may be calculated based on the same unique transaction data, but employing different password generating algorithms 360. Other sources of additional encryption passwords 460 may be envisioned as well, including for example and without limitation a password which has been privately shared (via other systems and methods, such as e-mail or secure network connection) between the two parties to a sales transaction.

The ciphertext transaction data 425 is then processed according to known algorithms 405 for generating a 2-D barcode 410.2, such as a QR code. In an alternative embodiment, a proprietary conversion algorithm 405 may be employed to generate a proprietary 2-D barcode 410.2. In FIG. 4B, the algorithm is represented schematically by an arrow 405. Such known algorithms 410 will be well understood by persons skilled in the relevant arts, and are not covered in detail here.

The result is a second 2-D barcode 410.2, which encodes the ciphertext transaction data 425.

Merging/Combining the Two 2-D Barcodes into One Image

In an embodiment of the present system and method, the two 2-D barcodes generated above—2-D barcode 410.1 representing the plaintext transaction data, and 2-D barcode 410.2 representing the encrypted transaction data (ciphertext)—are merged into a single combined 2-D barcode image 510, referred to equivalently and interchangeably herein as the "merged 2-D barcode image" 510, "merged image" 510, "merged matrix code image" 510, "multicolored matrix code" 510, and similar terms.

The combined 2-D barcode image 510, or merged image 510, is generated in such a way that a third-party who is viewing or parsing the merged image 510 would generally not be able to extract any data from the image 510. This is because a third-party would require access to a proprietary algorithm to reconstruct the two original 2-D barcodes 410. At the same time, with access to the appropriate algorithm, the two initial 2-D barcodes 410 can later be recovered from the merged image 510.

FIG. 5 provides a schematic illustration of an exemplary method 500 for merging plaintext 2-D barcode 410.1 and ciphertext 2-D barcode 410.2 into a merged 2-D barcode image 510.

In an embodiment, plaintext 2-D barcode 410.1 and ciphertext 2-D barcode 410.2 are graphically merged by combining each corresponding cell from the two source 2-D barcodes 410, and generating a designated color cell 515 for different combinations of source cells. "Corresponding cells" are cells which share a same coordinate position; for examples, cells both in row X, column Y of plaintext 2-D barcode 410.1 and ciphertext 2-D barcode 410.2 are corresponding cells.

Understood another way, plaintext 2-D barcode 410.1 may be overlapped directly on top of ciphertext code 410.2 (or vice versa). The overlap of any two source cells generates a cell combination 515 which may be assigned a specific color.

In an exemplary embodiment illustrated in FIG. 5:
 a cell combination 515.1 of two white cells generates a resulting white cell;
 a cell combination 515.2 of two black cells generates a resulting black cell;
 a cell combination 515.3 of a white cell from plaintext 2-D barcode 410.1 overlapping a black cell from ciphertext 2-D barcode 410.2 generates a resulting red cell; and
 a cell combination 515.4 of a black cell from plaintext 2-D barcode 410.1 overlapping a white cell from ciphertext 2-D barcode 410.2 generates a resulting blue cell.

The above combinations, as illustrated in FIG. 5, are exemplary only. Other combination schemes may be envisioned within the scope and spirit of the present system and method. For example, in an alternative embodiment, two overlapped white cells could generate a black cell, or could generate yet another color, such as green.

In an alternative embodiment, a designated cell combination could be randomly mapped to any of several designated color options for merged cells. For example, a merging 515.3 of a white cell over a black cell could be mapped randomly to any of white, red, or brown. For another example, a merging 515.4 of a black cell over a white cell could be mapped randomly to any of blue, orange, or violet. For third-parties who do not know the proprietary mapping algorithm, the use of additional possible output colors may further confound any efforts to "unmerge" or separate the merged image 510 into the original two 2-D barcodes 510.

The output result of the process is the merged, 2-D barcode 510 (which in FIG. 5 is illustrated in cells with shades of gray rather than in color).

Sizes (Cell Dimensions) of the 2-D Barcodes:

It will be noted that the method 500 may be applied to two 2-D bar codes 410 which are of equal size (that is, equal horizontal numbers of cells and equal vertical numbers of cells). The method 500 may also be applied to a first 2-D barcode 410 of a first size and a second 2-D barcode 410 of a different second size, as illustrated in FIG. 5. (For example, the ciphertext data 425 may be reduced in length compared to the plaintext data 240, or greater in length. The resulting ciphertext barcode 410.2 may be respectively smaller or larger than the plaintext barcode 410.1.) In the latter case, some cells of the larger barcode 410 may be not-merged, or remain "unmerged", with any cells of the smaller barcode 410. The merger of the remaining, overlapping cells of the two barcodes 410 still provides security against third-parties attempting to retrieve the two original barcodes. In an embodiment of the present system and method, unmerged cells may remain in their original black and white colors in the merged barcode 510. In an alternative embodiment, unmerged cells may still be mapped to alternative colors, to render the merged 2-D barcode 510 still less susceptible to decoding by unauthorized parties.

Cell-by-Cell and Pixel-by-Pixel:

It will be noted that 2-D barcode merging has been described above as being implemented on a cell-by-cell basis. Persons skilled in the relevant arts will appreciate that, in an alternative embodiment, the color combination algorithms of the present system and method may be implemented instead on an image-pixel by image-pixel basis.

Exemplary Code:

Presented here is exemplary code (which may for example be in C, C++, Java, or a similar programming language, or may be pseudocode which can be implemented in specific form in any number of known programming languages) of a kind which may be employed to merge plaintext 2-D barcode 410.1 and ciphertext 2-D barcode 410.2 into a merged, 2-D barcode image 510:

```
{// Merge two pixels of same color
if             Actual_Invoice_QRCode(x,y).
   PixelColor==Encrypted_Invoice_QRCode(x,y).Pixel-
   Color Then
Copy Encrypted_Invoice_QRCode(x,y).PixelColor to
   MergedQRCodeImage(x,y).PixelColor;
// Merge two pixels of different colors
if             Actual_Invoice_QRCode(x,y).PixelColor
   !=Encrypted_ Invoice_QRCode(x,y).PixelColor
{if             Actual_Invoice_QRCode(x,y).P
   ixelColor=="WHITE" && if Encrypted_Invoice_QR-
   Code(x,y).PixelColor=="BLACK" Then
MergedQRCodeImage(x,y).PixelColor="RED"
if       Actual_Invoice_QRCode(x,y).PixelColor==
   "BLACK" && if Encrypted_Invoice_QRCode(x,y).
   PixelColor=="WHITE" Then
MergedQRCodeImage(x,y).PixelColor="BLUE"
}
```

Persons skilled in the relevant arts will recognize that the above code sample is exemplary only, and other code and other color combinations may be employed within the scope and spirit of the present system and method.

The resulting, merged, 2-D barcode 510 encodes, in full, both the original plaintext transaction data 240 and the encrypted transaction data 425. Merged image 510 can be transmitted to either party to the transaction (for example seller or purchaser) as a graphical image. As will be discussed further below, merged image 510, and the transaction data which it contains, can be readily validated at the receiving end to establish whether the received data is valid or if instead the received data has been corrupted in any way.

Paper-Free Bill or "e-Bill":

In an embodiment of the present system and method, the merged image 510 may constitute a final, complete paper-free bill, which encodes all transaction data 240 in an image. In an alternative embodiment (discussed further below, see FIGS. 6, 7, and 8), the paper free bill or e-bill may be constituted by the merged image 510 further concatenated with a biometric signature image 712 or other electronic signature.

Transaction Affirmation Via Digitized Biometric Signatures

Conventionally, business transactions such as sales transactions are affirmed, witnessed, or validated by one or both parties to the transaction. For printed documents, a commonly used form of affirmation is the written signature of one or both parties.

In embodiments of the present system, the electronic transactions document(s) created, recorded, and transmitted may be affirmed by biometric signatures 605 which are graphical (that is, image-oriented) in nature. In various embodiments, possible biometric signatures 605 may include, for example, and without limitation: fingerprint images, palm-print images, iris scans, retinal scans, and even facial photos.

In an embodiment of the present system and method, the biometric signature 605, such as a fingerprint 605, is in two colors only, or "monochrome", the two colors often being (as is conventional in the art) black and white, or two other colors with strong relative contrast. In an embodiment, the biometric signatures 605, such as a fingerprint 605 or handprint, or even an iris print, retinal scan, or facial photo, may originally be captured in grayscale or multiple colors. The grayscale or color image may be reduced to a two-color monochrome, such as black and white pixels, via known image processing methods, while retaining image quality and retaining essential image features and image data for purposes of biometric identification of persons.

In an embodiment of the present system and method, a biometric signature of both parties to the transaction is captured via an imaging device or scanner, such as biometric sensor 160 or camera 170 of tablet device 100. The biometric images 605 can be concatenated to the merged 2-D barcode image 510 with the document data, as described further below.

In an embodiment of the present system and method, the graphical biometric signatures 605 may be scrambled or encoded in a variety of ways prior to concatenation and digital transmission. The scrambling or encoding help ensure that, if the digital transaction document (e-bill) is improperly intercepted or otherwise obtained by third-parties (not parties to the transaction), the biometric signatures 605 cannot be recognized or interpreted. In this way, only legitimate signatory parties to the financial transaction can read and validate the biometric signatures 605.

FIGS. 6 and 7 illustrate successive stages of an exemplary method of scrambling/encoding biometric document signatures 605. While the figures employ fingerprints 605 by way of example, persons skilled in the relevant arts will recognize that the exemplary method illustrated is readily applicable to other biometric signatures such as hand-prints, iris scans, retinal scans, or facial photos.

Fingerprint Shuffling:

FIG. 6 illustrates an exemplary biometric signature 605, in this case fingerprint 605. In an embodiment, a captured fingerprint 605 of a transaction participant is captured, for example via biometric sensor 160 or camera 170 of tablet device 100, with sufficient resolution to capture needed details of the signature. In an embodiment, an image resolution of 512 dots per inch (DPI) may be employed. Other resolutions may be employed as well.

Once captured, fingerprint 605 is spatially divided into subparts 607 via image processing software running on processor 105 or other firmware of tablet 100. In the exemplary embodiment shown, fingerprint 605 is spatially divided into sixteen (16) separate sub-parts 607 of equal width/height dimensions; other numbers of sub-parts 607, greater or lesser, may be employed as well.

As discussed above (see FIG. 3), processor 105 or other firmware of tablet 100 is used to generate an image shuffling sequence 365 based on transaction data 240. FIG. 6 illustrates a specific exemplary shuffling sequence 365.1 (the same as illustrated in FIG. 3 above). The sequence 365.1 shown is arbitrary and purely for illustration, and many other document-specific sequences may be generated by the present system and method based on transaction-specific data 240.

The fingerprint shuffling sequence 365 maps the original image from its original spatial ordering to a new spatial ordering. In an exemplary embodiment, the subparts 607 may be numbered sequentially, starting with number '1' in an upper-left corner, and incrementing by one (1) reading from left-to-right and top-row to bottom-row as shown. Each sub-part 607 is then mapped from its original location to the formal location of another sub-part 607. The result is a shuffled fingerprint image 615.

Two Shuffled Fingerprints:

With reference now to FIG. 7, and in an embodiment, fingerprint images 605.1 and 605.2 are provided by a respective first party to the financial/sales transaction and a second party to the financial/sales transaction. The signatures 605 serve as affirmations or validations of the transaction(s) by the respective parties.

In an embodiment of the present system and method, two fingerprint images 605.1, 605.2 are each shuffled into two respective shuffled fingerprint images 615.1, 615.2. In an embodiment of the present system and method, both of fingerprint images 605.1, 605.2 are shuffled according to a common or same fingerprint shuffling sequence 365. In an alternative embodiment, the present system and method may generate two different fingerprint shuffling sequences 365.1, 365.2; and the present system and method may then shuffle each of fingerprint images 605.1, 605.2 according to the respective first and second fingerprint shuffling sequences 365.1, 365.2.

Merging/Combining the Two Shuffled Fingerprints into One Image:

In an embodiment of the present system and method—and similar to the manner in which two black-and-white 2-D barcodes 410 may be merged into a single, multi-colored 2-D barcode 510 (see FIG. 5 above)—shuffled fingerprints 615.1 and 615.2 (which may be black and white, as is conventional in the art)—are merged into a single, combined multi-colored shuffled fingerprint image 712, referred to equivalently herein as the "merged fingerprint image" 712.

The merged fingerprint image 712 is generated in such a way that a third-party who is viewing or parsing the merged fingerprint 712 would generally not be able to extract the two original shuffled fingerprints 615.1, 615.2. This is because a third-party would require access to a proprietary algorithm to reconstruct the two original shuffled fingerprints 615.1, 615.2. At the same time, with access to the appropriate algorithm, the two initial shuffled fingerprints 615.1, 615.2 can later be recovered from the merged fingerprint image 712.

In an embodiment, shuffled fingerprint 605.1 and shuffled fingerprint 605.2 are graphically merged by combining each corresponding pixel from the two source shuffled fingerprints 605, and generating a designated color pixel 715 for different combinations of source pixels. "Corresponding pixels" are pixels which share a same coordinate position, that is, both pixels are in row X, column Y of respective shuffled fingerprints 615.1 and 615.2. This merging process is illustrated diagrammatically in FIG. 7 via process arrow 705.

Understood another way, shuffled fingerprint 615.1 may be overlapped directly on top of shuffled fingerprint 615.2 (or vice versa). The overlap of any two source pixels generates a merged pixel combination 715 which may be assigned a specific color.

In an exemplary embodiment illustrated in FIG. 7:
a pixel combination 715.1 of two white pixels generates a resulting black pixel;
a pixel combination 715.2 of two black pixels generates a resulting white pixel;
a pixel combination 715.3 of a white pixel from shuffled fingerprint 615.1 overlapping a black pixel from shuffled fingerprint 615.2 generates a resulting blue pixel; and
a combination 715.4 of a black pixel from shuffled fingerprint 615.1 overlapping a white pixel from shuffled fingerprint 615.2 generates a resulting red pixel.

The above combinations, as illustrated in FIG. 7, are exemplary only. Other color combination schemes may be envisioned within the scope and spirit of the present system and method.

In an alternative embodiment, a designated pixel combination could be randomly mapped to any of several colors of merged pixels. For example, a merging 715.3 of a white pixel over a black pixel could be mapped randomly to any of Red, Yellow, or Brown. For another example, a merging 715.4 of a black pixel over a white pixel could be mapped randomly to any of Blue, Orange, or Violet. For another example, two overlapped white pixels or two overlapped black pixels could be mapped to colors other than black or white. For third-parties who do not know the proprietary mapping algorithm, the use of additional possible output colors may further confound any efforts to "unmerge" or separate the merged image 712 into the original two shuffled fingerprints 615.1, 615.2.

Code (which may for example be in C, C++, Java, or a similar programming language, or may be pseudocode which can be implemented in specific form in any number of known programming languages) may be employed to merge shuffled fingerprints 605.1, 605.2 into a merged, multi-colored shuffled fingerprint 712. Such code may be the same or substantially similar to that discussed above in conjunction with FIG. 5, and will not be repeated here.

The resulting merged, multi-colored shuffled fingerprint image 712 combines in full both of the original shuffled fingerprints 615.1, 615.2. Merged image 712 can be transmitted to either party to the transaction (for example seller or purchaser) as a graphical image. As will be discussed further below, merged image 712 can be readily validated at the receiving end to confirm that the fingerprints 605.1, 605.2, which were generally obtained at the point-of-transaction, match expected fingerprints (such as fingerprints stored in a suitable database [such as an employee database, customer database, etc.] or fingerprints obtained live from DSD personnel, in real-time, at the place and time of fingerprint validation).

Final Transaction Document Image

In an embodiment of the present system and method, a final transaction document image 805 is formed by combining or concatenating the merged 2-D barcode image 510 (see FIG. 5 above) with the merged shuffled fingerprint image 712 (see FIG. 7 above). FIG. 8 illustrates an exemplary concatenation of a merged 2-D barcode image 510 with a merged shuffled fingerprint image 712, resulting in a final transaction document image 805.

In an embodiment, the final transaction document image 805 is composed by spatially placing the two source images (merged 2-D barcode image 510 and merged shuffled fingerprint image 712) side-by-side, or one spatially above or spatially below the other; or, put another way, by placing the two source images 510, 712 spatially adjacent to each other. In an embodiment, a border or borders 807 of a designated color or shading may be placed around either or both of merged 2-D barcode image 510 and merged shuffled fingerprint image 712. Border 807 may help distinguish the two separate images within the overall final transaction document 805. Border 807 may also help ensure that the final transaction document 805 has a conventional rectangular image shape.

In alternative embodiments, other two-dimensional spatial arrangements may be made between merged 2-D barcode image 510 and merged shuffled fingerprint image 712 to compose the overall final transaction document image 805. In an embodiment, the sizes (pixel dimensions) of merged 2-D barcode image 510 and shuffled fingerprint image 712 can be adjusted in final transaction document image 805 for easy transfer and decoding.

In an alternative embodiment (not illustrated), additional image modifications may be made to final transaction document image 805. These may entail for example applying one or more data-lossless image deformations, such as skewing, rippling, or twirling, to FTD image 805. At a receiving end, and for purposes of data recovery, the present system and method would then entail first applying a suitable reverse deformation (deskew, unripple, untwirl, etc.), with suitable inverse deformation parameters, to the received FTD image 805.

In an embodiment, within final transaction document image 805, each and both of merged 2-D barcode image 510 and merged shuffled fingerprint image 712 are so arranged that the two source images 510, 712, when concatenated, may still be readily distinguished from each other; and equally, so that each source image 510, 712 is not obscured by the other. This ensures that the data contained in each of merged 2-D barcode image 510 and merged shuffled fingerprint image 712 is not obscured by the other image. It further ensures that, on the receiving end, image processing software can readily extract and separate both of merged 2-D barcode image 510 and merged shuffled fingerprint image 712.

In an alternative embodiment, within final transaction document image 805, each and both of merged 2-D barcode image 510 and merged shuffled fingerprint image 712 may be so arranged that the two source images 510, 712 partially or wholly overlap, with for example still further, additional pixel color mappings for overlapped pixels. In such alternative embodiments, additional algorithms on the receiving end would separate the two source images 510, 712, according to suitable algorithms to distinguish overlapping pixels.

Paper-Free Bill or "e-Bill":

In an embodiment of the present system and method, the final transaction document image 805, which encodes all transaction data 240 in an image and also includes a biometric signature image 712, constitutes a "paper-free bill". This may also be referred to equivalently as an "e-bill", or similarly a "paper-free-" or "e-" invoice, receipt, transaction document, etc., for example a paper-free invoice, an e-invoice, an e-receipt, or by similar transaction document terms as applicable.

Image Data Transfer: Local Transfer, and Transfer from Point-of-Transaction to Remote Offices It will be noted that, at the point-of-sale, where final transaction document (FTD) image 805 is created, the FTD image 805 may be transferred between transaction parties via local wired or wireless communications. For example, if FTD image 805 is created on tablet 100 (for example, by the seller), FTD image 805 may then be transferred to the buyer's tablet or to a cellular phone via a wireless connection such as Bluetooth or a local WiFi network. FTD image 805 may also be transferred from the seller to the buyer's cellular phone or tablet via a wired connection such as USB or Ethernet.

With reference now to FIG. 9, in an embodiment of the present system and method: Final transaction document (FTD) image 805, which is generally created at the point-of-service on tablet 100, can then be transmitted to appropriate business offices or other parties for processing and validation. For example, FTD image 805 may be sent to the business offices of a buyer and seller who engaged in a sales transaction at the point-of-service.

Direct Transmission:

In an embodiment, FTD image 805 may be transmitted by a first transmission process 915.1, for example via conventional e-mail, via FTP (file transfer protocol), cellular network transmission, or similar, from tablet 100 to the receiving parties. FTD image 805 may be sent in any known conventional document format, such as JPG, PNG, TFF, BMP, GIF, and others well known in the art, provided the image format permits sufficiently clear image resolution and detail for data recovery at the receiving end.

The received FTD image 940 is obtained by the receiving party. The received image 940 is processed via a decode and validation process 950 (discussed further below) to yield the original transaction document values 240 and fingerprints 605.

Indirect Transmission Via Image Capture:

In an alternative embodiment of the present system and method, FTD image 805 may first be captured in the field by another imaging device, such as a cell phone 905. For example, one of the parties to the point-of-service transaction may employ a cell phone 905 to capture the image of FTD image 805 as shown directly on a display screen 120 of tablet 100. Because cell phone imaging is subject to manual uncertainties (such as imperfect orientation of the cell phone 905 by the user, or hand motion of the cell phone 905 by the user), the captured image 910 may be subject to imperfections. These imperfections may include skewing of the image, partial rotation of the image, slight blurring, or other imperfections.

Captured FTD image 805 may be transmitted by a second transmission process 915.2 (for example, via the cellular network methods employed by a suitable cell phone service provider) from cell phone 905 to the receiving parties. Captured FTD image 805 may be sent in any known conventional document format, such as JPG, PNG, TFF, BMP, GIF, and others well known in the art.

The received FTD image 940 is obtained by the receiving party. The received, captured FTD image 945 will have any imperfections caused by the image capture process on cell phone 905.

In an embodiment of the present system and method, on the receiving end, received capture FTD image 945 may be subject to image-correction processes 947, such as deskewing, rotation, image sharpening, and other appropriate image-processing methods generally known in the art. The result is a corrected received image 940 which is the same, or substantially the same, as the final transaction document image 805.

The corrected received image 940 is further processed via a decode and validation process 950 (discussed further below) to yield the original transaction document values 240 and fingerprints 605.

Method for Transaction Document Encoding into Verifiable Image Format

FIG. 10 presents a flow-chart of an exemplary method 1000 for an electronic device, such as a tablet computer 100, to encode commercial transaction data 240 and visual biometric transaction signatures 605 (such as fingerprints) obtained at a point-of-service sales transaction into a secure, self-verifiable image format 510, 805, or final transaction document image 510, 805.

The exemplary method 1000 may entail some method steps which may be the same or similar to many method steps previously discussed above in this document (see FIGS. 2 through 10 and associated discussions). Therefore, some exemplary details which are discussed at length above in this document are not repeated here. It will be understood by persons skilled in the relevant arts that methods, steps, and processes discussed throughout this document (and associated computer code which may be used in actual implementation), including specifically those of method 1100 as well as other methods above, may be combined or integrated in suitable combinations to achieve the outputs, outcomes and purposes described herein.

The exemplary method 1000 may be performed via an electronic processing device, such as tablet 100, which is used to obtain, store, and process commercial transaction data, such as a sale and payment between two parties. The method 1000 may be performed after transaction data has been entered into, and stored, on tablet 100. The method 1000 may also be performed by a secondary, associated electronic processing device (which also has a processor, memory, and other elements similar to tablet 100), and which is communicatively coupled to tablet 100 to obtain data from tablet 100. For convenience of exposition only, the discussion below assumes method 1000 is performed via tablet 100.

Persons skilled in the relevant arts will recognize that the order of steps in method 1000 is exemplary only, and some steps shown later in method 1000 may be performed before steps which are described herein as earlier in the method 1000.

The method 1000 begins with step 1005. In step 1005, method 1000 extracts unique transaction data 240 and other distinctive transaction data 240 from a transaction document 200. (See FIGS. 2 and 3 above for related discussion.) In an embodiment of the present system and method, step 1005 also entails extracting other remaining document data which is neither unique nor distinctive, but which may be encoded as well in 2-D barcode format. (It will be understood that references herein to "transaction data 240" may include such other remaining, not unique, not distinctive document data.) The transaction data 240, in its original alphanumeric form, and not encrypted, is referred to also as plaintext data.

In step 1010, method 1000 generates a first two-dimensional (2-D) bar code 410.1, such as a matrix code or QR code. The encoding process 405 writes the plaintext transaction data 240 into a graphical form 410.1, typically a matrix or other arrangement of black-and-white cells or bars. (See FIG. 4A above for related discussion.)

In step 1015, method 1000 generates a document-specific encryption password 360 which is based on, and is generally unique to, the unique transaction data 240 from document 100. The document-specific encryption password 360 (also referred to herein simply as "password 360") may be generated according to any number of encryption methods 310 known in the art, or according to a proprietary encryption algorithm 310, as long as encryption algorithm 310 generates the password 360 based upon and unique to the unique transaction data 240. (See FIG. 3 above for related discussion.)

In step 1020, method 1000 generates encrypted transaction data 425. Encrypted transaction data 425 is generated via a specified data encryption algorithm 420, and encrypts transaction data 240 by employing the document-specific password 360 discussed above (possibly along with additional passwords). The output of the step is encrypted, or "ciphertext", transaction data 425. (See FIG. 4B above for related discussion.)

In step 1025, method 1000 generates a second two-dimensional (2-D) bar code 410.2, such as a matrix code, QR code, or other arrangement of black-and-white cells or bars. This encodes 405 the ciphertext transaction data 425 into a graphical form 410.2. (See FIG. 4B above for related discussion.)

In step 1030, method 1000 generates a merged 2-D barcode 510 which integrates the data from first barcode 410.1 and second barcode 410.2. Merged barcode 510 is created in such a way as to encode all the data from first barcode 410.1, which is the plaintext transaction data 420; and also all the data from second barcode 410.2, which is the ciphertext transaction data 425. (See FIG. 5 above for related discussion.)

In an embodiment, merged barcode 510 is generated by overlapping corresponding cells of first barcode 410.1 and second barcode 410.2, and mapping various overlapped cell combinations to designated colors. Therefore, in an embodiment, merged barcode 510 is a multicolored barcode. A color mapping function, table, or algorithm may be implemented to perform such a mapping, mapping a first cell overlapping a second cell to a specific color. An exemplary code sample may be, for example and without limitation:

OriginalCell_1_Color(m, n)=a; OriginalCell_2_Color(m, n)=b;

OriginalCell_1_Color(m, n)+OriginalCell_2_Color(m, n)→FinalCellColor(a, b), where 'm' and 'n' are row and column values; while 'a' and 'b' may take values of '0' or '1' for "Black" and "White" respectively. The plus (+) operator indicates overlapping the first cell over the second cell; and a table FinalCellColor(a, b) may be defined with values such as Green, Yellow, Red, Blue depending on the specific values (0 or 1) of a and b. For example, FinalCellColor (0, 0) may be defined as "Yellow", and so maps a black-on-black cell combination to the color yellow for a single combined cell.

Other similar mappings, including mappings which allow for inclusion of alternative or additional colors, may be envisioned as well. (See again FIG. 5 above for related discussion.)

In an embodiment of the present system and method, method 1000 stops after completion of step 1030, the method having generated the multi-colored merged barcode 510, which may also serve as the Final Transaction Document (FTD) image 805.

In an alternative embodiment, transaction document 200 includes, or has associated with it, graphical biometric signatures 605 which represent signatures of the human parties to the transaction. Graphical biometric signatures may be fingerprints, hand prints, iris scans, retinal scans, facial images, or similar. In such embodiments, method 1000 may continue (after step 1030) with step 1035.

In step 1035, exemplary method 1000 generates a unique, document-specific image shuffling sequence 365 based on the unique transaction data 240. Image shuffling sequence 365 maps a set of digits, typically starting at 1 and incrementing by 1, back onto itself, but in a different order. The order mapping is an indicator of how sections 607 of a biometric image 605 may be spatially re-ordered to create shuffled biometric image 615. The digits may be shuffled or re-ordered according to any of a variety of shuffling methods

350, as long as shuffling algorithm 350 generates the shuffling sequence 365 both based upon and unique to the unique transaction data 240. (See FIGS. 3 and 6 above for related discussion.)

In step 1040, method 1000 obtains the graphical biometric signatures 605 of the transaction parties, for example the fingerprints 605 of a buyer and a seller. The graphical biometric signatures 605 are typically images in such formats as GIF, JPG, BMP, and other graphical formats known in the art. (See FIG. 6 and other figures above for related discussions.)

In step 1045, method 1000 divides each of the biometric images 605 (such as fingerprints 605) into multiple image segments 607, typically square or rectangular in shape. The image segments 607 are mutually non-overlapping, but together the image segments 607 may be spatially arranged in their original order of spatial relations and original orientations to reconstruct each biometric image 605. In an embodiment, the segments 607 are labeled/numbered with sequential digits, in order to be shuffled according to image shuffling sequence 365. (See FIG. 6 above for related discussion.)

In step 1050, method 1000 spatially rearranges each of the first biometric image 605.1 and the second biometric image 605.2, to create respective, shuffled biometric images 615.1, 615.2. The shuffling is done according to the order indicated by the mapping in the document-specific image shuffling sequence 365. (See again FIG. 6 above for related discussion.)

In step 1055, method 1000 generates a merged shuffled biometric signature 712. Merged biometric signature 712 is created in such a way as to encode substantially all the image data from first shuffled biometric image 615.1 and from second shuffled biometric image 615.2. (See FIG. 7 above for related discussion.)

In an embodiment, merged shuffled biometric signature 712 is generated by overlapping corresponding image pixels of first shuffled biometric image 615.1 and second shuffled biometric image 615.2, and mapping various overlapped pixel combinations to designated colors. Therefore, in an embodiment, merged shuffled biometric signature 712 is a multicolored image. As with merged barcode 510 discussed above, a color mapping function, table, or algorithm may be implemented to perform such a mapping, mapping a first pixel overlapping a second pixel to a specific final color pixel. (See again FIG. 7 above for related discussion.)

In step 1060, method 1000 forms a combined document image 805 which may be referred to as the Final Transaction Document (FTD) image 805, and which spatially concatenates merged 2-D barcode image 510 with merged shuffled biometric image 712. In an embodiment, the two images are concatenated by arranging them spatially side-by-side in one image. (See FIG. 8 above for related discussion.)

Received Data: Data Retrieval and Validation

In an embodiment of the present system and method, the FTD image 805 is transmitted to receiving parties, which may for example be business offices associated with the point-of-transaction seller and/or buyer. (See FIG. 9 above for related discussion.)

The transaction data encoded in the FTD image 805 can be extracted at the receiving end. In addition, data validation may be performed if there are any controversies between sender and receiver.

FIG. 11 illustrates an exemplary method 1100 for data recovery and validation by a receiving party. Method 1100 may be performed on the receiving end by any processing device, such as a tablet 100 or other computing device equipped with a suitable processor, memory, and computer code configured to implement the steps of exemplary method 1100. Method 1100 may also be performed on the sending end of the transaction as well (for example, for pre-validation before sending).

In step 1105 the method 1100 extracts from FTD image 805 both of:

the merged 4-color 2-D barcode 510; and the merged shuffled fingerprint image 712.

In an embodiment, extraction of the two images 510, 712 involves a straightforward spatial parsing of the two images, as the two images are placed spatially side-by-side and are non-overlapping in FTD image 805.

In step 1110, method 1100 extracts, from merged 2-D barcode 510, each of the first 2-D barcode 410.1 with the plaintext data 240, and also the second 2-D barcode 410.2 with the ciphertext data 425. In an embodiment, extracting the two barcodes 410 is performed by reversing the method 500 described above in association with FIG. 5.

Consider for example any cell of merged 2-D barcode 510 at a cell coordinate (X, Y). The cell 510 will have a specific color. The corresponding cells at (X, Y) coordinates of first 2-D barcode 410.1 and second 2-D barcode 410.2 are restored by determining the overlapped cell combinations 515 which resulted in the output color.

Presented here is exemplary code (which may for example be in C, C++, Java, or a similar programming language, or may be pseudocode which can be implemented in specific form in any number of known programming languages) of a kind which may be employed to distinguish plaintext 2-D barcode 410.1 and ciphertext 2-D barcode 410.2 from a merged, 2-D barcode image 510:

```
{// Merged cell color is WHITE
if Merged_QRCode_Image(x,y).PixelColor=="WHITE"
    Then
    Actual_Invoice_QRCode(x,y).PixelColor="WHITE"
        AND         Encrypted_Invoice_QRCode(x,y).
        PixelColor="WHITE";
// Merged cell color is BLACK
if      Merged_QRCode_Image        (x,y).
        PixelColor=="BLACK" Then
    Actual_Invoice_QRCode(x,y).PixelColor="BLACK"
        AND         Encrypted_Invoice_QRCode(x,y).
        PixelColor="BLACK";
// Merged cell color is RED
if Merged_QRCode_Image (x,y).PixelColor=="RED"
    Then
    Actual_Invoice_QRCode(x,y).PixelColor="WHITE"
AND         Encrypted_Invoice_QRCode(x,y).
PixelColor="BLACK";
// Merged cell color is BLUE
if Merged_QRCode_Image (x,y).PixelColor=="BLUE"
    Then
    Actual_Invoice_QRCode(x,y).PixelColor="BLACK"
        AND         Encrypted_Invoice_QRCode(x,y).
        PixelColor="WHITE";
}
```

Persons skilled in the relevant arts will recognize that the above code sample is exemplary only, and other code and other color combinations may be employed within the scope and spirit of the present system and method.

In step 1115, method 1100 extracts a first set of plaintext unique transaction document data (labeled herein as 240.1, though not specifically shown in FIG. 11) from the recovered first 2-D barcode 410.1. This first set of plaintext transaction data 240.1 is recovered by extracting data from first 2-D barcode 410.1 according to a suitable barcode data extraction method known in the art for the specific 2-D barcode technology employed.

In step 1120, method 1100 generates an encryption password 360. The encryption password 360 is generated from the first set of unique plaintext transaction data 240.1, and is the same encryption password 360 as generated originally to create encrypted data 425 at the point-of-sale. (See FIG. 4B above for related discussion.)

In step 1125, method 1100 extracts the ciphertext transaction document data 425 from the recovered second 2-D barcode 410.2. Ciphertext data 425 is recovered by extracting data from second 2-D barcode 410.2 according to a suitable barcode data extraction method known in the art for the specific 2-D barcode technology employed.

In step 1130, method 1100 decrypts ciphertext data 425 by applying the encryption password 360 (which was generated in step 1120) to ciphertext data 425 according to a suitable decryption algorithm; the suitable decryption algorithm is one designed to decrypt ciphertext generated in step 1020 of method 1000 above via encryption algorithm 420. (See also FIG. 4B above for related discussion.) The output of the decryption process is a second set of plaintext unique transaction document data (labeled herein as 240.2, though not specifically shown in FIG. 11).

Summarizing to this point, a first set of plaintext unique transaction document data 240.1 has been extracted from first 2-D barcode 410.1, while a second set of plaintext unique transaction document data 240.2 has been recovered from second 2-D barcode 410.2

In step 1135, method 1100 compares first set of plaintext transaction document data 240.1 with second set of plaintext transaction document data 240.2. If document and data integrity has been maintained, the two sets of plaintext data 240.1, 240.2 should be the same.

If the comparison of step 1135 determines that first set of plaintext transaction document data 240.1 and second set of plaintext transaction document data 240.2 are not the same, then in step 1140.1 method 1100 determines that the retrieved data is invalid or corrupted, or that in some other way data integrity has not been maintained. The method may stop at this point. In an alternative embodiment (not illustrated in the flow chart for FIG. 11), and in spite of the loss of data integrity, the method 1100 may continue with step 1145 and steps successive therefrom.

If the comparison of step 1135 determines that first set of plaintext transaction document data 240.1 and second set of plaintext transaction document data 240.2 are the same, then in step 1140.1 method 1100 determines that the retrieved data is valid, that is, that data integrity has been maintained.

In an alternative embodiment (not shown in FIG. 11), the present system and method does not compare plaintext transaction document data 240.1 with plaintext transaction document data 240.2. Instead, the method 1100 may first encrypt plaintext transaction document data by applying the encryption document data. The method 1100 then compares this newly encrypted transaction document data with the encrypted transaction document data extracted from recovered second 2-D barcode 410.2. If the two sets of encrypted data 425 are equal, data integrity has been maintained. If the two sets of encrypted data 425 are not equal, data integrity may be determined to have been lost.

In an embodiment of the present system and method, method 1100 may stop at this point. In an alternative embodiment, method 1100 continues with step 1145.

In step 1145, method 1100 generates the unique image shuffling sequence 365 from the first set of plaintext unique transaction document data 240.1. The unique image shuffling sequence 365 is the same as that generated originally to create shuffled biometric images 615 at the point-of-sale. (See FIGS. 4B and 6 above for related discussion. See also step 1035 of method 1000, discussed above in conjunction with FIG. 10.)

In step 1150, method 1100 generates an inverse image shuffling sequence, which is the inverse of image shuffling sequence 365. In an embodiment, the inverse image shuffling sequence is simply a reverse of the mapping of image shuffling sequence 365, and can be used to restore a shuffled biometric image 615 to the corresponding original biometric image 605 (such as an original, unshuffled fingerprint image 605).

In step 1155, method 1100 extracts, from merged shuffled biometric image signature 712, the first shuffled biometric image 615.1 and the second shuffled biometric image 615.2. These images may for example be the shuffled images of the transaction-participant fingerprints 605 originally obtained at the point of service.

In an embodiment, extracting the two shuffled biometric image 615 is performed by reversing the method described above in association with FIG. 7.

Consider for example any pixel of merged 2-D barcode 712 at a cell coordinate (X, Y). The pixel 712 will have a specific color. The corresponding pixels at (X, Y) coordinates of first shuffled biometric image 615.1 and second shuffled biometric image 615.2 are restored by determining the overlapped pixel combinations 715 which resulted in the output (merged) pixel color.

Presented here is exemplary code (which may for example be in C, C++, Java, or a similar programming language, or may be pseudocode which can be implemented in specific form in any number of known programming languages) of a kind which may be employed to extract first shuffled biometric image 615.1 and second shuffled biometric image 615.2 from a merged shuffled biometric image 712:

```
{// Merged pixel color is WHITE
if                    Merged_Biometric_Image(x,y).
   PixelColor=="WHITE" Then
{First_Biometric_Image(x,y).PixelColor="BLACK"
   AND              Second_Biometric_Image(x,y).
   PixelColor="BLACK" };
// Merged pixel color is BLACK
if                    Merged_Biometric_Image(x,y).
   PixelColor=="BLACK" Then
{First_Biometric_Image(x,y).PixelColor="WHITE"
   AND              Second_Biometric_Image(x,y).
   PixelColor="WHITE" };
// Merged cell color is BLUE
if  Merged_Biometric_Image(x,y).PixelColor=="BLUE"
   Then
{First_Biometric_Image(x,y).PixelColor="WHITE"
   AND              Second_Biometric_Image(x,y).
   PixelColor="BLACK" };
// Merged cell color is RED
if   Merged_Biometric_Image(x,y).PixelColor=="RED"
   Then
{First_Biometric_Image(x,y).PixelColor="BLACK"
   AND              Second_Biometric_Image(x,y).
   PixelColor="WHITE" };
}
```

Persons skilled in the relevant arts will recognize that the above code sample is exemplary only, and other code and other pixel color combinations may be employed within the scope and spirit of the present system and method.

In step 1160, method 1100 reverse-shuffles each of the first shuffled biometric image 615.1 and the second shuffled biometric image 615.2 (from step 1155), both according to the inverse image shuffling sequence generated in step 1150. The result is a respective $1^{st}$ unshuffled biometric image signature 615.1 (for example, an image recognizable as a first fingerprint) and a $2^{nd}$ unshuffled biometric image signature 615.2 (for example, an image recognizable as a second fingerprint).

In step 1165, method 1100 obtains, from a suitable employee or personnel database, a stored biometric image (such as a fingerprint) which is expected for one or both parties to the sales transaction. In an alternative embodiment, step 1165 may obtain one or both validation fingerprint images of expected human parties to the transaction via live, real-time scanning of their fingerprints with a local or remote fingerprint scanner. The expected fingerprints, of the persons who should be the signatories to the transaction, may be referred to herein as the "validation biometric signatures" or equivalently as the "stored/live biometric signatures". ("Image" may also be used in place of "signature".)

In step 1170, the method 1100 may compare the first unshuffled biometric image 615.1 with a stored/live biometric image for a first party to the sales transaction. If the two images compare favorably (that is, are determined to be biometric images of the same person, such as fingerprints of the same person), then in step 1175.1 the first signature on the electronic document is considered to be verified as valid. If the two images do not compare favorably (that is, are determined to not be biometric images of the same person, or may not be biometric images of the same person), then in step 1175.2 the first signature on the electronic document is considered to be not verified or invalid.

Similarly, and also in step 1170, the method 1100 may compare the second unshuffled biometric image 615.2 with a stored/live biometric image for a second party to the sales transaction. If the two images compare favorably (are determined to be biometric images of the same person, such as fingerprints of the same person), then in step 1175.1 the second signature on the electronic document is considered to be verified as valid. If the two images do not compare favorably (that is, are determined to not be biometric images of the same person, or may not be biometric images of the same person), then in step 1175.2 the second signature on the electronic document is considered to be not verified or invalid.

Note: In an embodiment, for fingerprint comparisons and validation, the present system and method may employ proprietary code. In an alternative embodiment, the present system and method may also employ open source code for fingerprint comparisons. See for example:

https://sourceforge.net/projects/sourceafis/

Additional Considerations and Embodiments

The present system and method supports the collection, recording, encoding and encryption, transmission, and validation of commercial transaction data (such as bills of sales and sales receipts) at a point-of-sale and at other locations. These tasks are accomplished entirely electronically/digitally, via an electronic processing device such as a tablet 100, without the use of paper forms. However, the present system and method still retains many of the benefits as paper forms, along with additional advantages.

1. Paper Bills Cannot be Tampered with Easily.

The present system and method identifies if any of the files have been tampered with or modified by extracting the actual (plaintext) data 2-D barcode 410.1 and the encrypted (ciphertext) data 2-D barcode 410.2. If the encrypted data 2-D barcode 410.2 was not decrypted properly or not matched with the actual transaction data 240, then the present system and method may consider that the data files have been tampered with, modified, or corrupted.

2. Easily Detectable Forgery Signatures.

Hand-written signatures may be easily forged, but fingerprints 605 and other graphical biometric signatures 605 cannot be readily forged. Further, by virtue of the fingerprint shuffle sequence 365 and the merging of fingerprint images into a combined shuffled fingerprint image 712, the original fingerprint image can only be reconstructed by parties in possession of the proprietary shuffling and merging algorithms employed.

Other Features

In various embodiments, the present system and method offers these features:

The electronic bill (e-bill) can be captured and transmitted by either transaction party by taking a picture of the e-bill via a mobile device or camera, such as a cell phone 905.

A merged, multi-color fingerprint image 712 is employed for e-Bill file authentication. In an embodiment, the method employs a color-coding scheme to merge two separate fingerprints 712.

An e-bill-specific encryption password 360 and an e-bill-specific fingerprint shuffling sequence 360 are uniquely generated from critical, transaction-specific data.

The actual data 2-D barcode 410.1 and the encrypted data 2-D barcode 410.2 are overlapped via a color-coding scheme to create a multi-colored 2-D barcode 510 for storing invoice data 240.

Additional Embodiments

The present system and method may be implemented in any workflow applications as a licensed feature, and so provide the present system and method as integrated workflow functionality. The present system and method may be offered as a complete functionality as a software service or in a software development kit (SDK) to incorporate the present system and method in business-to-business (B2B) customer applications.

In various embodiments, the present system and method may be employed for Direct Store Delivery (DSD) applications and also for Less than Truck Load (LTL) applications to completely avoid paper bills.

In various embodiments, the present system and method may include separate software modules or systems to create and/or read paper free bills.

In embodiments of the present system and method, potential benefits and cost-savings compared to paper billing may include:

Reduced physical efforts for carrying and handling of papers, scanners, and printers;

Effort of scanning and power charging of printers will be avoided;

Avoid the costs of papers, scanners, and printers;

Avoid costs of maintaining safe storage facilities for hardcopy bills which must be stored for many years;

Time required for searching the required bills from paper storage may be saved;

Costs of digital signature licenses and maintenance may be avoided;

Time of scanning, printing, and loading papers to printers may be eliminated;

Having wired or wireless connections is not mandatory to transfer the e-bill; just taking the e-bill photograph is enough to share the file.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;

U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;

U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HANDHELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HANDHELD DIMENSIONER WITH DATA-QUALITY INDICATION filed Oct. 21, 2014 (Laffargue et al.);
U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

In the description above, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped (repeated). Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

Further, in some embodiments, certain method decision steps or branching points discussed herein may be eliminated within the scope and spirit of the present system and method; still further; additional options, alternative outcomes, or entire additional decision or branching points may be added within the scope and spirit of the present system and method.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and 8 are true (or present).

What is claimed is:

1. A method, comprising:
generating, based upon a unique, plaintext data from a transaction document for a sales transaction:
a unique password for data encryption; and
a unique finger-print shuffling sequence;
receiving a first fingerprint image and a second fingerprint image from a respective first and second party to the sales transaction;
encrypting the unique plaintext data with the unique password to generate a ciphertext data;
generating a first two-dimensional two-color barcode (2-D barcode) representing the plaintext unique data, wherein the first 2-D barcode comprises a light color and a dark color;
generating a second two-dimensional two-color barcode (2-D barcode) representing the ciphertext data, wherein the second 2-D barcode comprises the light color and the dark color;
merging the first 2-D barcode and the second 2-D barcode into a merged multicolored 2-D barcode, wherein each distinct color of the multicolored 2-D barcode represents a designated combination of two light-colored cells, two dark-colored cells, a dark-colored cell and a light-colored cell, or a light-colored celled and a dark-colored cell from the first 2-D barcode and the second 2-D barcode;
dividing each of the first fingerprint image and the second fingerprint image into a respective plurality of first image parts and second image parts;
spatially shuffling each of the first plurality of image parts and the second plurality of image parts to generate a respective first shuffled fingerprint image and a second shuffled fingerprint image, wherein said spatial shuffling is in accordance with the unique finger-print shuffling sequence;
merging the first shuffled fingerprint image and the second shuffled fingerprint image into a combined shuffled fingerprint image; and
concatenating the merged multicolored 2-D barcode and the combined shuffled fingerprint image into a final transaction document image.

2. The method of claim 1, further comprising:
validating said final transaction document image, whereby the integrity of the encoded data is determined.

3. The method of claim 2, wherein said validating comprises:
separating the final transaction document image into two separate images to recover a retrieved merged multicolored 2-D barcode and a retrieved combined shuffled fingerprint image;
extracting a plaintext data 2-D barcode and a ciphertext data 2-D barcode from the retrieved merged multicolored 2-D barcode;
restoring a first plaintext data from the plaintext data 2-D barcode;
restoring a second plaintext data from the ciphertext data 2-D barcode;
determining if the first plaintext data restored from the plaintext data 2-D barcode matches the second plaintext data restored from the ciphertext data 2-D barcode;
upon determining that the first plaintext data restored from the plaintext data 2-D barcode matches the second plaintext data restored from the ciphertext data 2-D barcode, determining that the data integrity has been maintained; and
upon determining that the first plaintext data restored from the plaintext data 2-D barcode does not match the second plaintext data restored from the ciphertext data 2-D barcode, determining that data integrity has been lost.

4. The method of claim 3, wherein restoring the second plaintext data from the ciphertext 2-D barcode comprises:
generating, via the first plaintext data restored from the plaintext 2-D barcode, the unique password for data encryption; and
decrypting the ciphertext 2-D barcode via the unique password.

5. The method of claim 2, wherein said validating comprises:
separating the final transaction document into two separate images to retrieve a retrieved merged multicolored 2-D barcode and a retrieved combined shuffled fingerprint image;
extracting a plaintext data 2-D barcode and a first ciphertext data 2-D barcode from the retrieved merged multicolored 2-D barcode;
restoring the plaintext data from the plaintext data 2-D barcode;
generating, via the plaintext data restored from the actual 2-D barcode, the unique password for data encryption;
constructing a second ciphertext data 2-D barcode based on the plaintext data restored from the plaintext 2-D barcode and the unique password;
determining if the first ciphertext 2-D barcode and the second ciphertext 2-D barcode match;
upon determining that the first ciphertext 2-D barcode and the second ciphertext 2-D barcode match, determining that data integrity has been maintained; and
upon determining that the first ciphertext 2-D barcode and the second ciphertext 2-D barcode do not match, determining that data integrity has been lost.

6. The method of claim 1, wherein generating the unique password for data encryption based upon the unique plaintext data comprises generating the unique password via a proprietary password generation algorithm.

7. The method of claim 1, wherein generating the unique finger-print shuffling sequence based upon the unique plaintext data comprises generating the finger-print shuffling sequence via a proprietary data shuffling algorithm.

8. The method of claim 1, further comprising:
validating a biometric signature of said final transaction document image, whereby the integrity of the encoded shuffled fingerprint data is determined.

9. The method of claim 8, wherein said validating comprises:
separating the final transaction document into two separate images to recover a retrieved merged multicolored 2-D barcode and a retrieved combined shuffled fingerprint image;
extracting from the retrieved merged multicolored 2-D barcode the plaintext transaction data;
generating, based upon the plaintext transaction data, the unique fingerprint shuffling sequence;
recovering from the combined shuffled fingerprint image the first shuffled fingerprint image and the second shuffled fingerprint image; and
deshuffling, based on the unique fingerprint shuffling sequence, at least one of the first fingerprint image and the second fingerprint image.

10. The method of claim 1, wherein merging the first shuffled fingerprint image and the second shuffled fingerprint image into a combined shuffled fingerprint image comprises:
assigning a first color to darkened pixels of the first shuffled fingerprint image and a second color to background pixels of the first shuffled fingerprint image;
assigning a third color to darkened pixels of the second shuffled fingerprint image and a fourth color to background pixels of the second shuffled fingerprint image;
overlapping the first shuffled fingerprint image with the assigned first and second colors, and the second shuffled fingerprint image with the assigned third and fourth colors, whereby are generated paired combinations of overlapping pixels; and
assigning a respective color of a fifth plurality of colors to respective paired combinations of pixels of the first, second, third, and fourth colors of the overlapping image.

11. A method, comprising:
generating, based upon a unique data from an invoice for a transaction, a unique password for data encryption;
encrypting the unique data with the unique password to generate ciphertext data;
generating a first monochrome two-dimensional bar code (first 2-D barcode) representing the plaintext unique data;
generating a second monochrome two-dimensional barcode (second 2-D barcode) representing the ciphertext unique data; and
merging the first 2-D barcode and the second 2-D barcode into a merged multicolored 2-D barcode to obtain a final invoice image, wherein:
each color of the multicolored 2-D barcode represents a designated pairing of a first color or a second color of the first 2-D barcode with a third color or a fourth color of the second 2-D barcode.

12. The method of claim 11, further comprising:
validating said final invoice image, whereby the integrity of the encoded data is determined.

13. The method of claim 12, wherein said validating comprises:
extracting a plaintext data 2-D barcode and a ciphertext data 2-D barcode from the merged multicolored 2-D barcode of the final invoice image;
restoring the plaintext data from the plaintext data 2-D barcode;
restoring the ciphertext data from the ciphertext data 2-D barcode;
determining if the plaintext data restored from the plaintext data 2-D barcode matches the ciphertext data restored from the ciphertext data 2-D barcode;
upon determining that the plaintext data restored from the plaintext data 2-D barcode matches the ciphertext data restored from the ciphertext data 2-D barcode, determining that data integrity has been maintained; and
upon determining that the plaintext data restored from the plaintext data 2-D barcode does not match the ciphertext data restored from the ciphertext data 2-D barcode, determining that data integrity has been lost.

14. The method of claim 13, wherein determining if the plaintext data restored from the plaintext data 2-D barcode matches the ciphertext data restored from the ciphertext data 2-D barcode comprises:
generating, via the data restored from the plaintext 2-D barcode, the unique password for data encryption; and
decrypting, via the unique password, the ciphertext data restored from the ciphertext data 2-D barcode to recover an unencrypted data.

15. The method of claim 12, wherein said validating comprises:
extracting a plaintext data 2-D barcode and a first ciphertext data 2-D barcode from the merged multicolored 2-D barcode of the final invoice image;
restoring the plaintext data from the plaintext data 2-D barcode;
generating, via the plaintext data restored from the actual 2-D barcode, the unique password for data encryption;
constructing a second ciphertext data 2-D barcode based on the plaintext data restored from the plaintext 2-D barcode and the unique password;
determining if the first ciphertext 2-D barcode and the second ciphertext 2-D barcode match;
upon determining that the first ciphertext 2-D barcode and the second ciphertext 2-D barcode match, determining that data integrity has been maintained; and
upon determining that the first ciphertext 2-D barcode and the second ciphertext 2-D barcode do not match, determining that data integrity has been lost.

16. The method of claim 11, wherein generating the unique password for data encryption based upon the unique data comprises generating the unique password via a proprietary password generation algorithm.

17. The method of claim 11, further comprising:
generating a unique image shuffling sequence based upon the unique data;
obtaining a first biometric image and a second biometric image of a respective first and second party to the invoiced transaction;
dividing each of the first biometric image and the second biometric image into a respective plurality of first image parts and second image parts;
spatially shuffling each of the first plurality of image parts and the second plurality of image parts to generate a respective first shuffled biometric image and a second shuffled biometric image, wherein said spatial shuffling is in accordance with the unique image shuffling sequence;

merging the first shuffled biometric image and the second shuffled biometric image into a combined shuffled biometric image; and concatenating the merged multicolored 2-D barcode and the combined shuffled biometric image to form the final invoice image.

18. The method of claim 17, wherein generating the unique image shuffling sequence based upon the unique data comprises generating the image shuffling sequence via a proprietary data shuffling algorithm.

19. The method of claim 17, further comprising:
validating said final invoice image, whereby the integrity of the encoded shuffled biometric data is determined.

20. The method of claim 19, wherein said validating comprises:

separating the final invoice image into two separate images to recover a retrieved merged multicolored 2-D barcode and a retrieved combined shuffled biometric image;

extracting a plaintext data 2-D barcode from the retrieved merged multicolored 2-D barcode;

restoring the unique plaintext data from the plaintext data 2-D barcode;

generating, based upon the unique data restored from the plaintext 2-D barcode, the unique fingerprint shuffling sequence;

recovering from the combined shuffled biometric image the first shuffled biometric image and the second shuffled biometric image;

and deshuffling, based on the image shuffling sequence, at least one of the first biometric image and the second biometric image.

* * * * *